United States Patent
Murakami

(10) Patent No.: US 11,188,742 B2
(45) Date of Patent: Nov. 30, 2021

(54) INFORMATION PROCESSING APPARATUS AND MODEL DATA CREATING METHOD

(71) Applicant: FUJITSU LIMITED, Kawasaki (JP)

(72) Inventor: Ryo Murakami, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 16 days.

(21) Appl. No.: 16/782,063

(22) Filed: Feb. 5, 2020

(65) Prior Publication Data

US 2020/0175266 A1 Jun. 4, 2020

Related U.S. Application Data

(63) Continuation of application No. PCT/JP2017/028557, filed on Aug. 7, 2017.

(51) Int. Cl.
*G06K 9/00* (2006.01)
*G06T 7/246* (2017.01)

(52) U.S. Cl.
CPC ..... *G06K 9/00342* (2013.01); *G06K 9/00369* (2013.01); *G06T 7/251* (2017.01); *G06T 2207/10028* (2013.01); *G06T 2207/30196* (2013.01)

(58) Field of Classification Search
CPC .......... G06K 9/00369; G06K 9/00342; G06K 9/00335; G06K 9/00348; G06T 2207/10028; G06T 2207/30196; G06T 17/00; G06T 7/292; G06T 7/251; G06T 2207/30221; G06T 7/75
See application file for complete search history.

(56) References Cited

U.S. PATENT DOCUMENTS

| 9,235,928 | B2* | 1/2016 | Medioni | G06T 17/00 |
| 2010/0302247 | A1 | 12/2010 | Perez et al. | |
| 2011/0267344 | A1* | 11/2011 | Germann | G06T 15/205 345/420 |
| 2012/0275654 | A1 | 11/2012 | Fujiki et al. | |

(Continued)

FOREIGN PATENT DOCUMENTS

| EP | 3 624 059 A1 | 3/2020 |
| JP | 10-149445 A | 6/1998 |

(Continued)

OTHER PUBLICATIONS

Three-Dimensional Reconstruction of the Human Skeleton in Motion (Year: 2017).*

(Continued)

*Primary Examiner* — Nizar N Sivji
(74) *Attorney, Agent, or Firm* — Xsensus LLP

(57) ABSTRACT

An information processing apparatus includes a memory, and a processor coupled to the memory and configured to obtain point cloud data related to a surface of an object including a plurality of parts connected through joints from a sensor that obtains three-dimensional position information, perform, based on an object model that represents the plurality of parts by using a plurality of geometric models each having an axis, and the point cloud data, a search for an optimal solution of the object model that fits the point cloud data by changing the object model, and output the optimal solution or information of the object based on the optimal solution.

15 Claims, 18 Drawing Sheets

(56) References Cited

U.S. PATENT DOCUMENTS

| | | | | |
|---|---|---|---|---|
| 2014/0072175 | A1* | 3/2014 | Hasler | G06T 7/292 |
| | | | | 382/103 |
| 2014/0334670 | A1* | 11/2014 | Guigues | G06K 9/469 |
| | | | | 382/103 |
| 2015/0206003 | A1* | 7/2015 | Haker | G06T 19/20 |
| | | | | 345/420 |
| 2016/0110595 | A1* | 4/2016 | Wang | G06T 7/60 |
| | | | | 705/27.2 |
| 2016/0335790 | A1* | 11/2016 | Fleishman | G06T 17/10 |
| 2017/0186165 | A1* | 6/2017 | Taylor | G06T 7/75 |
| 2017/0337732 | A1* | 11/2017 | Tamersoy | G06K 9/6256 |
| 2017/0347055 | A1* | 11/2017 | Dore | G06T 7/60 |

FOREIGN PATENT DOCUMENTS

| | | | |
|---|---|---|---|
| JP | 2010-015472 A | | 1/2010 |
| JP | 2011-179907 A | | 9/2011 |
| JP | 2015-102913 A | | 6/2015 |
| JP | 2015102913 A | * | 6/2015 |

OTHER PUBLICATIONS

3D Reconstruction of Freely Moving Persons for Re-Identification with a Depth Sensor (Year: 2014).*
Accurate 3D Action Recognition using Learning on the Grassmann Manifold (Year: 2014).*
An Integrated Platform for Live 3D Human Reconstruction and Motion Capturing (Year: 2017).*
Leveraging Two Kinect Sensors for Accurate Full-Body Motion Capture—2015 Robust Human Body Shape and Pose Tracking (Year: 2013).*
Extended European Search Report dated Jul. 27, 2020, issued in corresponding European Patent Application No. 17921327.7.
Barros et al: "Real-Time Human Pose Estimation from Body-Scanned Point Clouds", Proceedings of the 10th International Conference on Computer Vision Theory and Applications, Jan. 1, 2015 (Jan. 1, 2015), pp. 553-560, XP055358213.
Loper et al: "SMPL: A Skinned Multi-Person Linear Model", ACM Transactions on Graphics, ACM, NY, US, vol. 34, No. 6, Oct. 26, 2015 (Oct. 26, 2015), pp. 1-16,XP058075343.
Zuffi et al: "The Stitched Puppet: A Graphical Model of 3D Human Shape and Pose", 2015 IEEE Conference on Computer Vision and Pattern Recognition (CVPR), IEEE, Jun. 7, 2015 (Jun. 7, 2015), pp. 3537-3546, XP032793804.
Migniot et al: "Part-Based 3D Multi-Person Tracking Using Depth Cue in a Top View", 2014 International Conference on Computer Vision Theory and Applications (VISAPP), Scitepress, vol. 3, Jan. 5, 2014 (Jan. 5, 2014), pp. 419-426, XP032792208.
International Search Report dated Oct. 3, 2017 for PCT/JP2017/028557 filed on Aug. 7, 2017, 5 pages including English Translation of the International Search Report.
Written Opinion of the International Search Authority dated Oct. 3, 2017 for PCT/JP2017/028557 filed on Aug. 7, 2017, 8 pages including English Translation of the International Search Report.
Horiuchi, E., "Hemi-form Geometric Models for Single-scan 3D Point Clouds," Journal of the Robotics Society of Japan, vol. 32, No. 38, Oct. 15, 2014, pp. 57-66 (See English Abstract).
Miyamoto, A., et al., "Human Pose Estimation from 3D Object Skeleton using Articulated Cylindrical Human Model," IPSJ SIG Notes, vol. 2006, No. 51, May 18, 2006, pp. 137-144 (See English Abstract).
Yamauchi, K., et al., "Recognizing Walking Humans in 3D," Image Lab, vol. 20, No. 12, Dec. 10, 2009, pp. 52-56.
Ye, M., and Yang, R., "Real-time Simultaneous Pose and Shape Estimation for Articulated Objects Using a Single Depth Camera," IEEE Conference on Computer Vision and Pattern Recognition, Jun. 2014, 8 pages.
Zuffi, Silvia, "Shape Models of the Human Body for Distributed Inference", Jan. 1, 2015, XP055685567, Retrieved from the Internet: URL:https://www.is.mpg.de/uploads_file/attachment/attachment/199/thesis.pdf, 162 pages.
Ye, Mao et al., "A Survey on Human Motion Analysis from Depth Data", Dagstuhl 2012 Seminar on Time-of-Flight Imaging and GCPR 2013 Workshop on Imaging New Modalities "In: 12th European Conference on Computer Vision, ECCV 2012", Jan. 1, 2013, Springer Berlin Heidelberg, XP055657330, vol. 8200, pp. 149-187.
Ganapathi, Varun et al., "Real-Time Human Pose Tracking from Range Data", Oct. 7, 2012, 12th European Conference on Computer Vision, ECCV 2012; [Lecture Notes in Computer Science],Springer Berlin Heidelberg, pp. 738-751, XP047019124.
Extended European Search Report dated Apr. 29, 2020 for related European Patent Application No. 17909083.2.
International Search Report of Int. Appl. No. PCT/JP2017/017695 dated Aug. 15, 2017.
Written Opinion of the International Searching Authority of Int. Appl. No. PCT/JP2017/017695 dated Aug. 15, 2017, with Partial Translation.
Office Action dated Jul. 15, 2020 issued with respect to the related U.S. Appl. No. 16/676,527.
Office Action dated Oct. 30, 2020 issued with respect to the related U.S. Appl. No. 16/676,527.

* cited by examiner

|  | x-COORDINATE [m] | y-COORDINATE [m] | z-COORDINATE [m] |
|---|---|---|---|
| $x_1$ | 0.12 | 0.24 | 5.13 |
| $x_2$ | -0.54 | 1.33 | 5.86 |
| $x_3$ | 0.88 | -0.47 | 6.41 |
| ⋮ | ⋮ | ⋮ | ⋮ |

FIG.8A l

|   | 1 | 2 | 3 | 4 | 5 | 6 | 7 | 8 | 9 | 10 | 11 | 12 | 13 |
|---|---|---|---|---|---|---|---|---|---|----|----|----|----|
| 1 | 0 | 0 | 0 | 0 | 0 | 0 | 0 | 0 | 0 | 0 | 0 | 0 | 0 |
| 2 | 1 | 0 | 0 | 0 | 0 | 0 | 0 | 0 | 0 | 0 | 0 | 0 | 0 |
| 3 | 1 | 1 | 0 | 0 | 0 | 0 | 0 | 0 | 0 | 0 | 0 | 0 | 0 |
| 4 | 1 | 1 | 0 | 0 | 0 | 0 | 0 | 0 | 0 | 0 | 0 | 0 | 0 |
| 5 | 1 | 1 | 0 | 1 | 0 | 0 | 0 | 0 | 0 | 0 | 0 | 0 | 0 |
| 6 | 1 | 1 | 0 | 1 | 1 | 0 | 0 | 0 | 0 | 0 | 0 | 0 | 0 |
| 7 | 1 | 1 | 0 | 0 | 0 | 0 | 0 | 0 | 0 | 0 | 0 | 0 | 0 |
| 8 | 1 | 1 | 0 | 0 | 0 | 0 | 1 | 0 | 0 | 0 | 0 | 0 | 0 |
| 9 | 1 | 1 | 0 | 0 | 0 | 0 | 1 | 1 | 0 | 0 | 0 | 0 | 0 |
| 10 | 0 | 0 | 0 | 0 | 0 | 0 | 0 | 0 | 0 | 0 | 0 | 0 | 0 |
| 11 | 0 | 0 | 0 | 0 | 0 | 0 | 0 | 0 | 0 | 1 | 0 | 0 | 0 |
| 12 | 0 | 0 | 0 | 0 | 0 | 0 | 0 | 0 | 0 | 0 | 0 | 0 | 0 |
| 13 | 0 | 0 | 0 | 0 | 0 | 0 | 0 | 0 | 0 | 0 | 0 | 1 | 0 |
| 14 | 0 | 0 | 0 | 0 | 0 | 0 | 0 | 0 | 0 | 0 | 0 | 0 | 0 |
| 15 | 0 | 0 | 0 | 0 | 0 | 0 | 0 | 0 | 0 | 0 | 0 | 0 | 0 | k

FIG.12

| DATA $x_n$ | PART m | | | | | | | | | | | | |
|---|---|---|---|---|---|---|---|---|---|---|---|---|---|
| | 1 (LOWER BACK) | 2 (TRUNK) | 3 | 4 | 5 | 6 | 7 | 8 | 9 | 10 | 11 | 12 | 13 |
| 1 | 0.9 | 0 | 0 | 0 | 0 | 0 | 0 | 0 | 0 | 0 | 0.1 | 0 | 0 |
| 2 | 0 | 0 | 0.5 | 0 | 0 | 0 | 0.4 | 0 | 0 | 0 | 0 | 0 | 0 |
| 3 | 0 | 0.7 | 0 | 0 | 0 | 0 | 0 | 0 | 0 | 0 | 0 | 0 | 0.2 |
| 4 | 0.8 | 0 | 0 | 0 | 0 | 0 | 0 | 0 | 0.1 | 0 | 0 | 0 | 0 |

FIG.13

| PART NAME | GEOMETRIC MODEL TYPE | JOINT ANGLE [rad.] (FRONT AND BACK, LEFT AND RIGHT) | LENGTH [m] | THICKNESS [m] (MAJOR AXIS, MINOR AXIS) |
|---|---|---|---|---|
| LOWER BACK | ELLIPTIC CYLINDER | (0, 0) | 0.11 | (0.12, 0.1) |
| TRUNK | ELLIPTIC CYLINDER | (0.12, 0.22) | 0.37 | (0.15, 0.13) |
| RIGHT COLLARBONE | | (0.53, 0) | 0.14 | |
| RIGHT UPPER ARM | CYLINDER | (0.2, −1.1) | 0.18 | 0.04 |
| . . . | . . . | . . . | . . . | . . . |

INFORMATION PROCESSING APPARATUS AND MODEL DATA CREATING METHOD

CROSS-REFERENCE TO RELATED APPLICATION

This application is a continuation application of International Application PCT/JP2017/028557 filed on Aug. 7, 2017 and designated the U.S., the entire contents of which are incorporated herein by reference.

FIELD

The present disclosure relates to an information processing apparatus, a non-transitory computer-readable storage medium for storing a model data creating program, and a model data creating method.

BACKGROUND

Based on point cloud data dotted on a surface of an object such as a human being, technology for tracing a structure of an object is known (e.g., Non Patent Document 1). This technology estimates a pose of an object by modelling a surface of an object with many divided meshes and fitting vertices of meshes to point cloud data based on a distance between one point and another point (i.e., a distance between two points).

RELATED-ART DOCUMENTS

Non Patent Document

[Non Patent Document 1] Mao Ye and Ruigang Yang, "Real-time Simultaneous Pose and Shape Estimation for Articulated Objects Using a Single Depth Camera", CVPR, 2014

Patent Document

[Patent Document 1] Japanese Laid-Open Patent Publication No. 10-149445
[Patent Document 2] Japanese Laid-Open Patent Publication No. 2011-179907

SUMMARY

According to an aspect of the embodiment, an information processing apparatus includes a memory, and a processor coupled to the memory and configured to obtain point cloud data related to a surface of an object including a plurality of parts connected through joints from a sensor that obtains three-dimensional position information, perform, based on an object model that represents the plurality of parts by using a plurality of geometric models each having an axis, and the point cloud data, a search for an optimal solution of the object model that fits the point cloud data by changing the object model, and output the optimal solution or information of the object based on the optimal solution.

The object and advantages of the embodiment will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 8A is an explanatory drawing illustrating $\chi_{k1}$;
FIG. 12 is an explanatory drawing illustrating a calculation result of a posterior distribution $p_{nm}$;
FIG. 13 is an explanatory drawing illustrating a fitting result.

DESCRIPTION OF EMBODIMENTS

It is difficult for the related art described above to obtain an accurate result with being robust to noise by a relatively low computation load when a state (e.g., a pose) of an object is recognized based on point cloud data. For example, in the related art described above, which models by meshes, a shape of an object can be represented in detail by increasing the number of vertices of meshes. With relatively many noisy data, however, representational power of the model cannot be effectively utilized for point cloud data, and an error easily increases. An error caused by a mesh spacing is added. In addition, when the number of points in a point cloud is 1,000 and the number of vertices of meshes is 1,000 for example, calculations for 1,000,000 combinations are necessary, and the amount of computation can be enormous.

According to at least one embodiment, a state of an object can be recognized based on point cloud data by a relatively low computation load in a manner robust to noise.

In the present specification, unless otherwise described, "derive a parameter (e.g., a parameter θ described later)" indicates "derive a value of a parameter".

Figure 1:
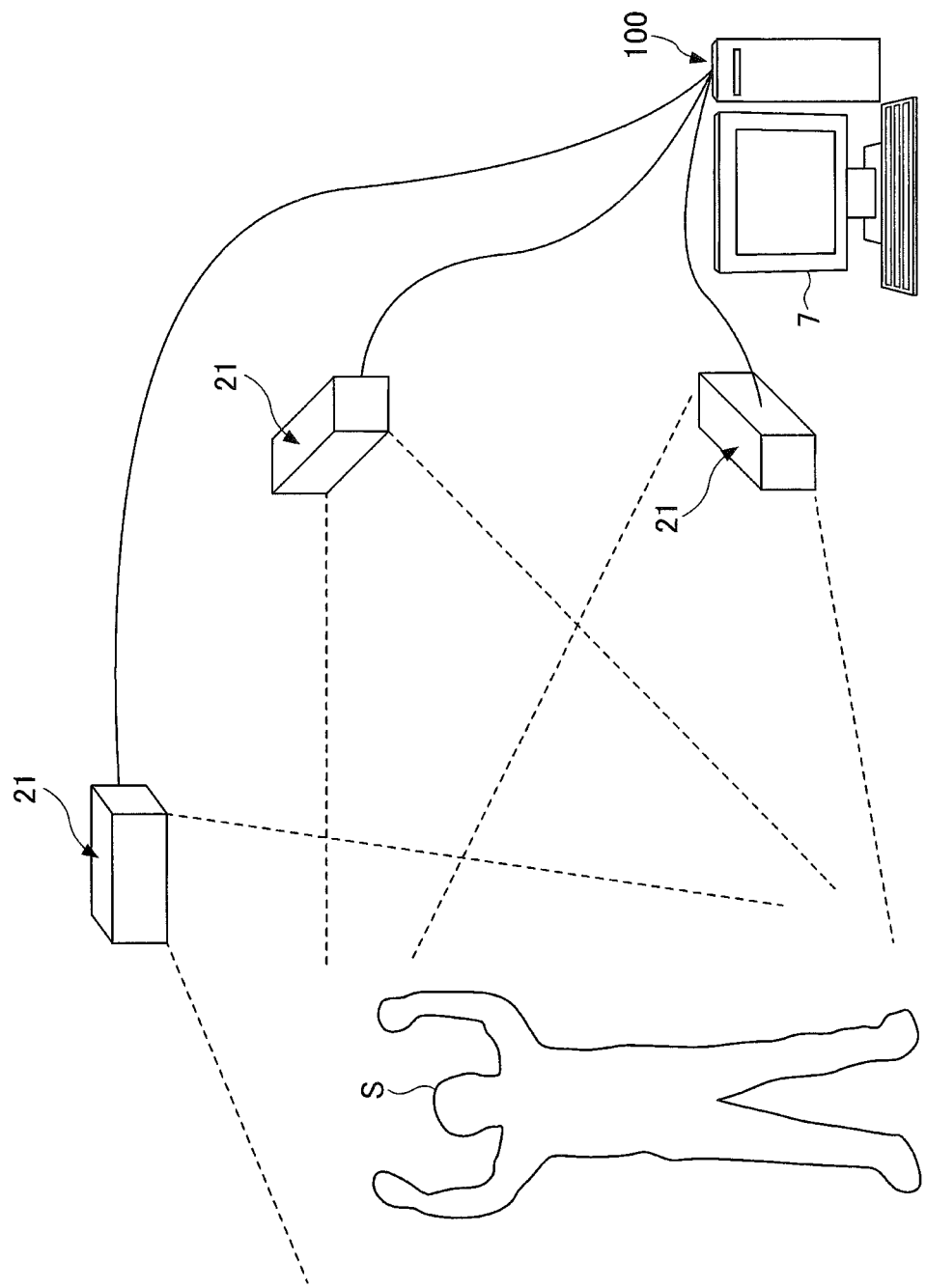
FIG. 1 is a drawing schematically illustrating a brief configuration of an object recognition system according to one embodiment.

FIG. 1 is a drawing schematically illustrating a brief configuration of an object recognition system 1 according to one embodiment. FIG. 1 illustrates an object person S (which is an example of an object) for explanation. In addition, FIG. 1 also illustrates a display device 7.

The object recognition system 1 includes a distance image sensor 21 and an object recognition apparatus 100 (which is an example of an information processing apparatus).

The distance image sensor 21 obtains a distance image of the object person S. For example, the distance image sensor 21 is a three-dimensional image sensor, and measures a distance by sensing an entire space, and obtains a distance image (which is an example of point cloud data) that includes distance information for each pixel as in a digital image. An obtaining method of distance information may be selected as suited. For example, an obtaining method of distance information may be an active stereo method that projects a specific pattern to an object, scans the specific pattern by an image sensor, and obtains a distance by using a triangulation method for geometric distortion of the projected pattern. Alternatively, an obtaining method of distance information may be a TOF (Time-of-Flight) method that projects a laser light, and detects a reflected light by an image sensor, and measures a distance by a phase difference between the laser lights.

The distance image sensor 21 may be installed in a manner that is a fixed position, or may be installed in a manner that is a movable position.

The object recognition apparatus 100 recognizes a joint or a bone of the object person S based on a distance image obtained by the distance image sensor 21. A recognition method will be described in detail later. The object person S is a human being or a humanoid robot, and includes multiple joints. In the following, as an example, the object person S is a human being. The object person S may be a specific individual person or an unspecified person depending on usage. For example, when a usage is an analysis of a movement at a sports such as gymnastics, the object person S may be a sports player. When a usage is an analysis of a strenuous movement (i.e., a fast and complex movement) at a sports such as gymnastics and figure skating, the multiple distance image sensors 21 are preferably installed as schematically illustrated in FIG. 1 so that point cloud data close to a three-dimensional shape of the object person S is obtained.

The object recognition apparatus 100 may be implemented by a configuration of a computer coupled to the distance image sensor 21. A connection between the object recognition apparatus 100 and the distance image sensor 21 may be implemented by a wired communication channel, a wireless communication channel, or a combination thereof. For example, when the object recognition apparatus 100 is a server configuration that is disposed in a location relatively remote to the distance image sensor 21, the object recognition apparatus 100 may be coupled to the distance image sensor 21 through a network. In this case, for example, a network may include a wireless communication network of a mobile phone, Internet, World Wide Web, VPN (virtual private network), WAN (Wide Area Network), a wired network or any combination thereof. When the object recognition apparatus 100 is disposed in a location relatively close to the distance image sensor 21, a wireless communication channel may be implemented by Near Field Communication, Bluetooth (registered trademark), Wi-Fi (Wireless Fidelity) for example. The object recognition apparatus 100 may be achieved by cooperation between two or more different devices (e.g., a computer and a server).

Figure 2:
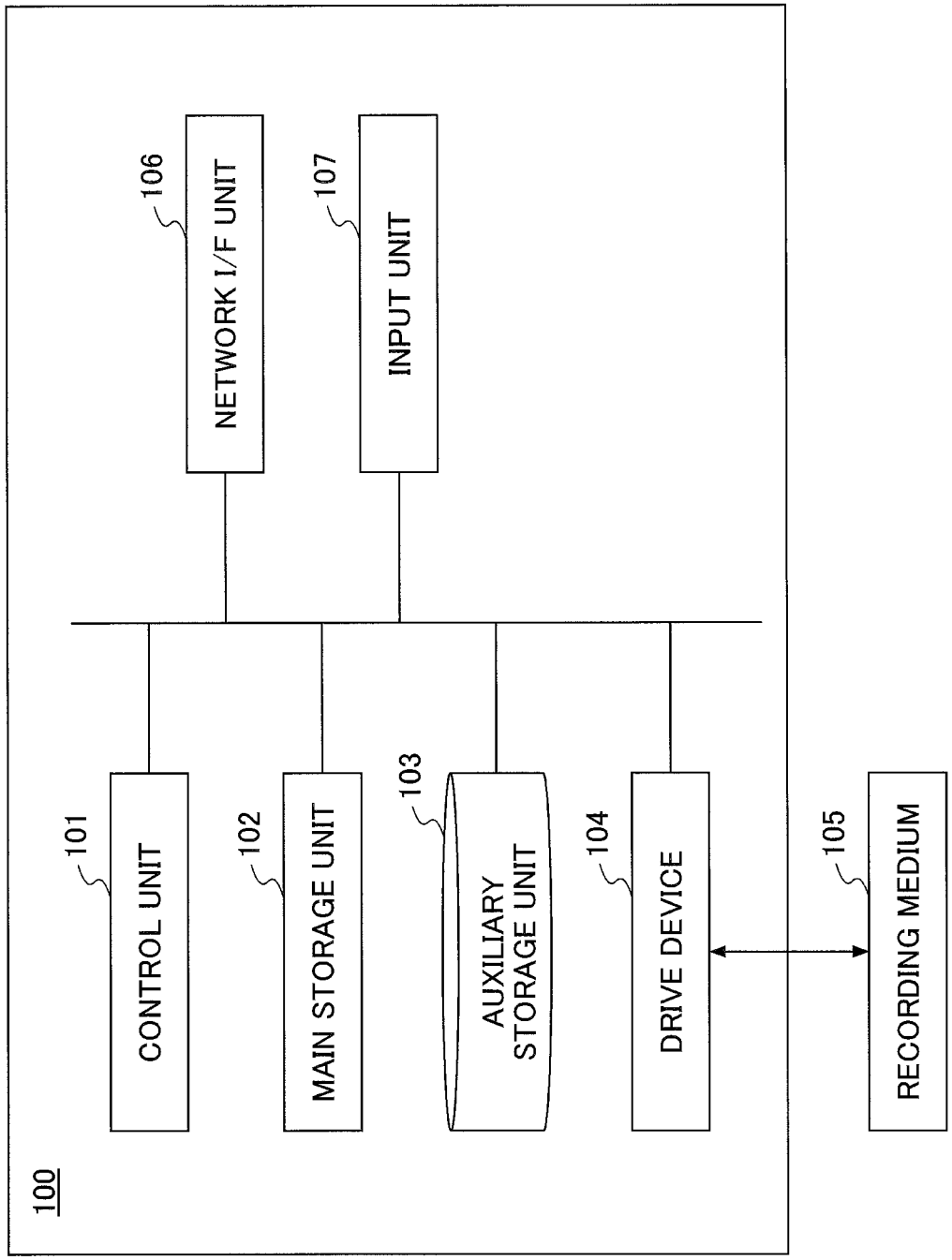
FIG. 2 is a drawing illustrating an example of a hardware configuration of an object recognition apparatus.

FIG. 2 is a drawing illustrating an example of a hardware configuration of the object recognition apparatus 100.

In the example illustrated in FIG. 2, the object recognition apparatus 100 includes a control unit 101, a main storage unit 102, an auxiliary storage unit 103, a drive device 104, a network I/F unit 106, and an input unit 107.

The control unit 101 is an arithmetic device that executes a program stored in the main storage unit 102 or the auxiliary storage unit 103, and receives data from the input unit 107 or a storage unit, and outputs to a storage unit or the like after calculating and processing. The control unit 101 may include a CPU (Central Processing Unit) or GPU for example.

The main storage unit 102 is a ROM (Read Only Memory) or a RAM (Random Access Memory) for example, and is a storage unit that stores or temporarily saves a program or data such as an OS that is basic software executed by the control unit 101 and application software.

The auxiliary storage unit 103 is an HDD (Hard Disk Drive) for example, and is a storage unit that stores data related to application software for example.

The drive device 104 reads a program from a recording medium 105 such as a flexible disk, and installs the program in the storage unit.

The recording medium 105 stores a predetermined program. The program stored in the recording medium 105 is installed in the object recognition apparatus 100 through the drive device 104. The installed predetermined program can be executed by the object recognition apparatus 100.

The network I/F unit 106 is an interface between a peripheral device (for example, the display device 7), which has a communication function and is connected through a network structured by a data transmission channel or channels such as a wired line, a wireless line, and a combination thereof, and the object recognition apparatus 100.

The input unit 107 includes a keyboard with a cursor key, a number input, various function keys and the like, a mouse, or a slice pat, for example. The input unit 107 may support another input method such as a voice input and a gesture.

In the example illustrated in FIG. 2, various processing or the like described below can be achieved by causing the object recognition apparatus 100 to execute a program. In addition, various processing or the like described below can be achieved by causing the object recognition apparatus 100 to read the recording medium that records the program. For the recording medium 105, various types of recording media can be used. For example, the recording medium 105 may be a recording medium that records information optically, electrically, or magnetically such as a CD-ROM, a flexible disk, and a magnet-optical disk, and a semiconductor memory that records information electrically such as a ROM and a flash memory. The recording medium 105 does not include a carrier wave.

Figure 3:
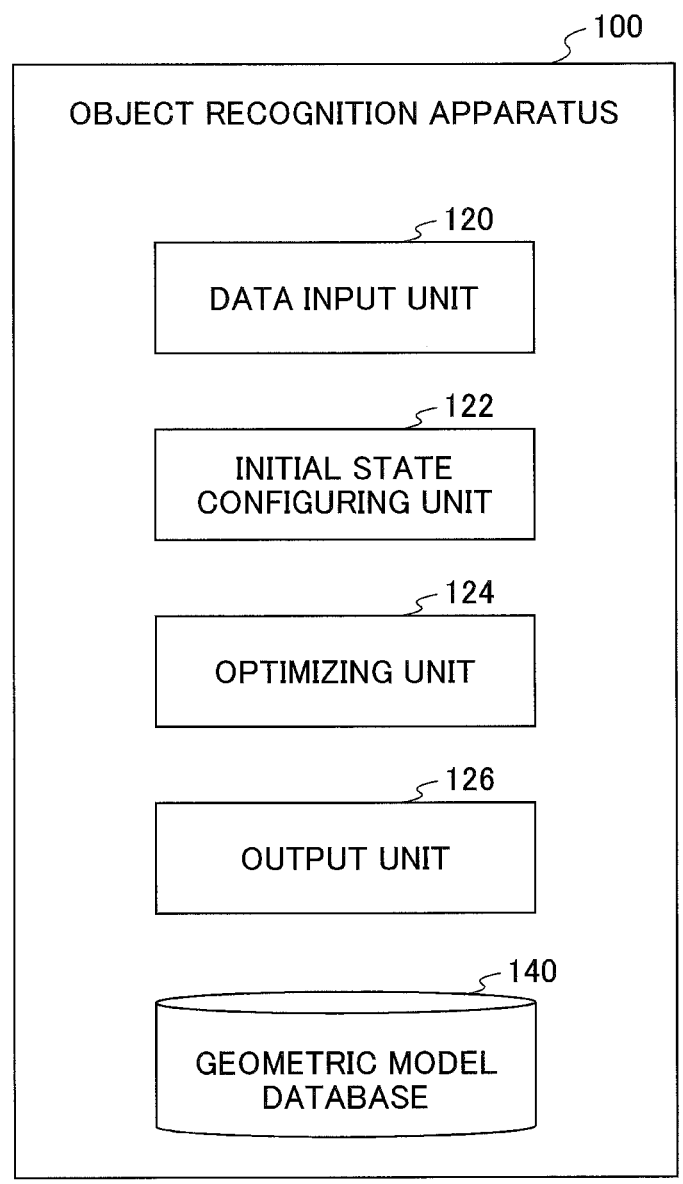
FIG. 3 is a block diagram illustrating an example of a function of an object recognition apparatus.

FIG. 3 is a block diagram illustrating an example of a function of an object recognition apparatus 100.

The object recognition apparatus 100 includes a data input unit 120 (an example of an obtaining unit), an initial state configuring unit 122, an optimizing unit 124 (an example of an optimization processing unit), and an output unit 126. Each of units from 120 to 126 can be implemented by the control unit 101, which is illustrated in FIG. 2, executing one or more programs stored in the main storage unit 102. A part of a function of the object recognition apparatus 100 may be achieved by a computer that can be embedded in the distance image sensor 21. The object recognition apparatus 100 includes a geometric model database 140 (which is illustrated in FIG. 3). The geometric model database 140 may be implemented by the auxiliary storage unit 103 illustrated in FIG. 2.

To the data input unit 120, a distance image (which will be hereinafter referred to as point cloud data) from the distance image sensor 21 is input, and a joint model to be used is also input. The point cloud data is as described above, and may be input every frame period for example. When the multiple distance image sensors 21 are used, the point cloud data may include a set of distance images output from the multiple distance image sensors 21.

Figure 4:
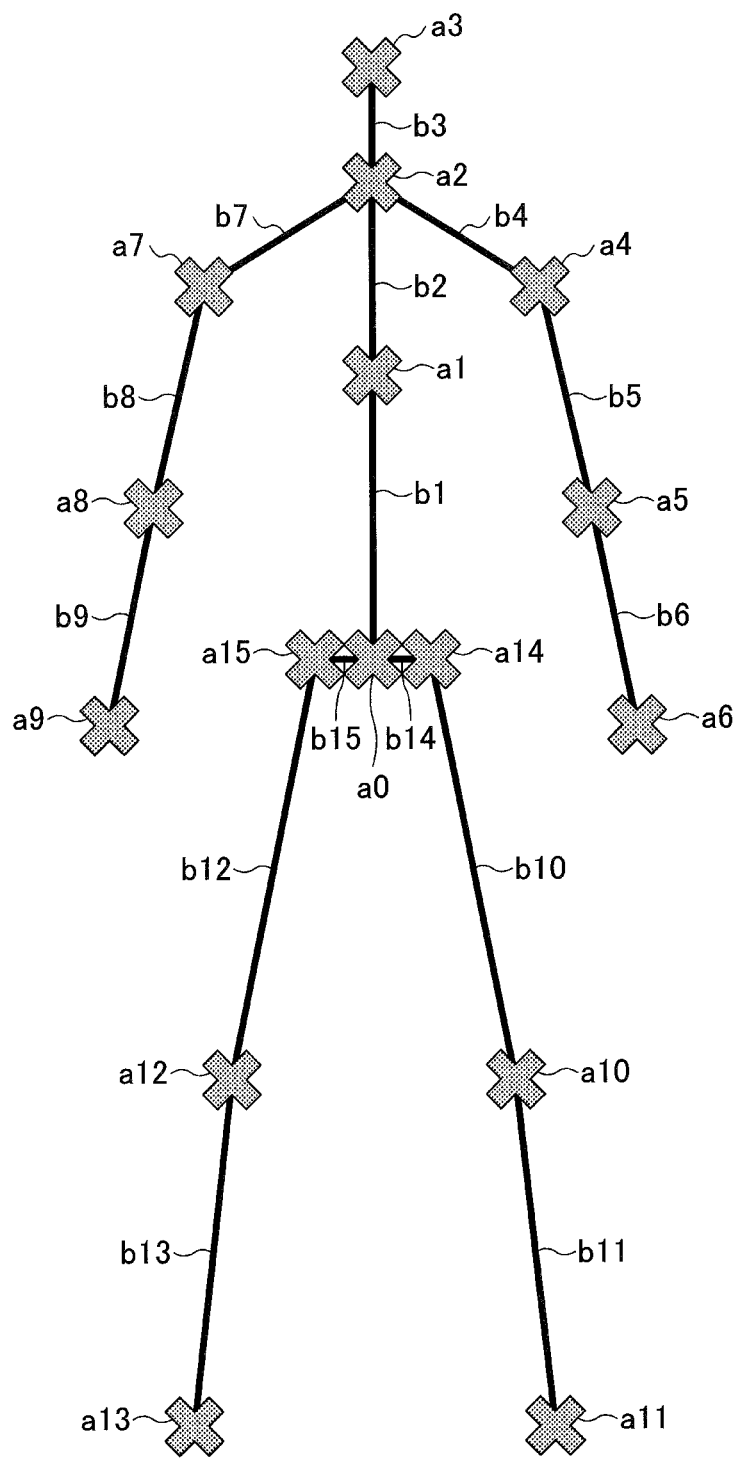
FIG. 4 is a drawing illustrating an example of a joint model.

A joint model to be used is any given model with respect to a joint of an object person S, and is a model represented by multiple joints and bones between joints (i.e., links). In the present embodiment, as an example, a joint model as described in FIG. 4 is used. A joint model as described in FIG. 4 is a 16 joints model that includes one joint in a head part, three joints in a trunk part (a body part), three joints in each of both arm parts, and three joints in each of both leg parts, and for the head part, both ends are determined as joints, and for the other parts, three points including both ends and a middle are determined as joints. Specifically, a joint model includes 16 joints from a0 to a15 and 15 bones from b1 to b15 that link between joints (alternatively, which are also referred to as parts from b1 to b15). In an understandable way, the joints a4 and a7 are joints of left and right shoulders, and the joint a2 is a joint on cervical spine, for example. The joints a14 and a15 are left and right hip joints, and the joint a0 is a joint on a lumbar spine. In such a joint model, the bones b14 and b15 of the hip joints and the bones b4 and b7 of the shoulder joints are bones that cannot be recognized with high accuracy only by fitting using a geometric model described later (which will be hereinafter referred to as hidden bones). In the description below, with respect to a position relationship about joints and parts, "ancestor" indicates a side close to the center of a body, and "descendant" indicates a side far from the center of a body.

Figure 5A:
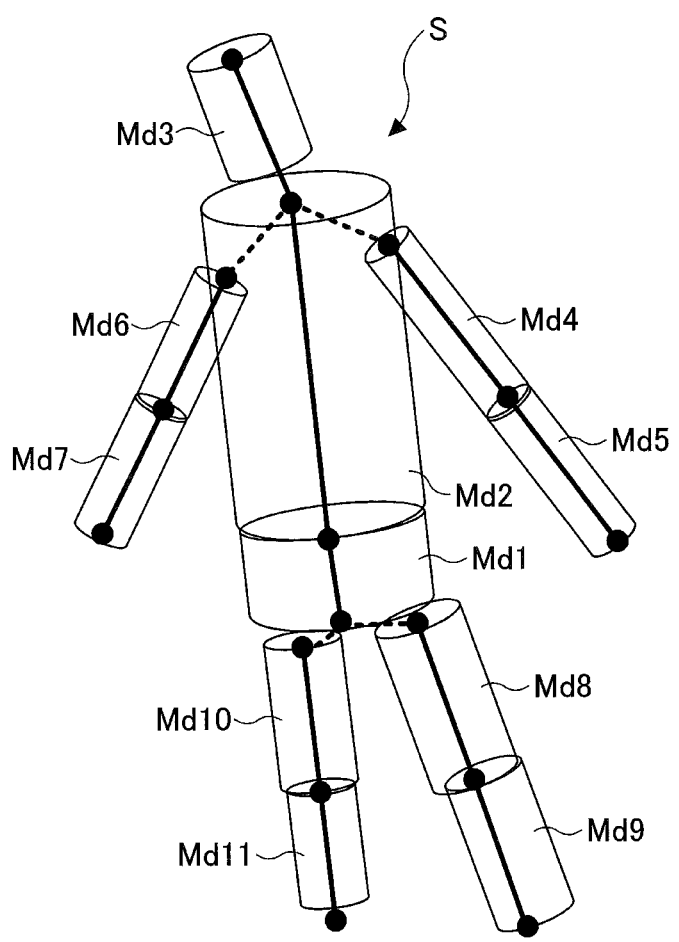
FIG. 5A is an explanatory drawing illustrating an example of an object model.

The initial state configuring unit 122 generates an initial state, which is used by the optimizing unit 124, of an object model based on the point cloud data input to the data input unit 120 and the geometric model in the geometric model database 140. The object model is a model of a body surface of the object person S, and is generated by the joint model to be used and the geometric model in the geometric model database 140. More specifically, the object model, as illustrated in FIG. 5A, is a model in which multiple geometric models are connected through multiple joints. Thus, the object model includes a geometric model for each of the parts (which are parts except hidden parts) of the object person S represented by the joint model. In the example illustrated in FIG. 5A, the object model is a model in which 11 geometric models from Md1 to Md11 are connected through multiple joints (represented by black circles). In the present embodiment, as an example, the object model illustrated in FIG. 5A is used. The geometric model in the geometric model database 140 is, for example, related to a cylinder, and in the following, a case that uses the geometric model related to a cylinder is mainly described. The possibility of another geometric model will be described later.

Figure 5B:
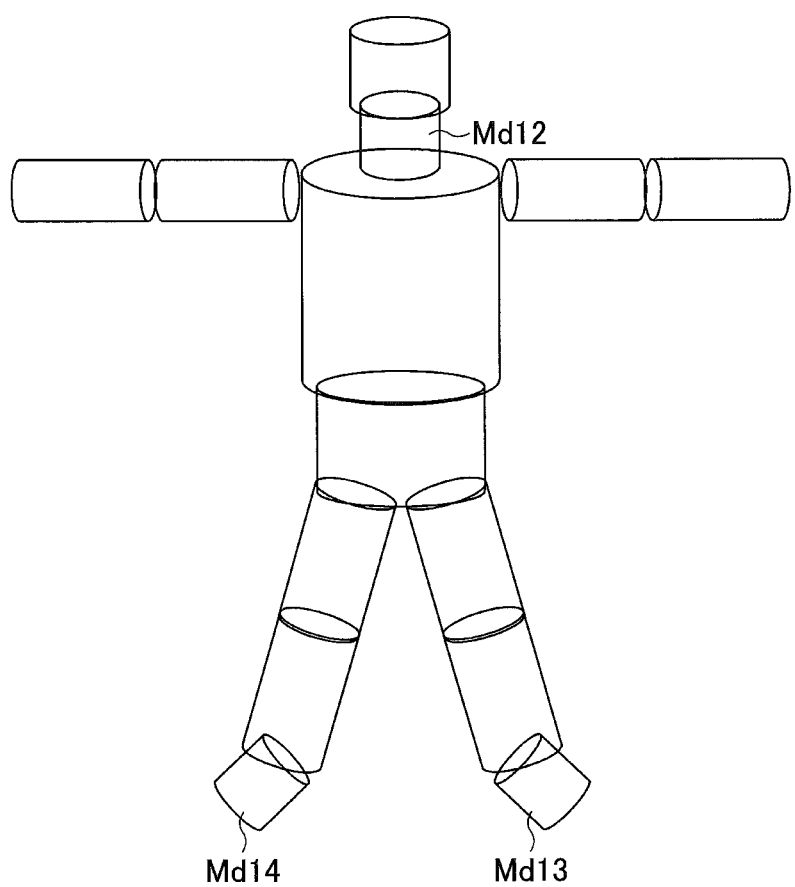
FIG. 5B is an explanatory drawing illustrating another example of an object model.

In a modified example, as illustrated in FIG. 5B, more geometric models may be used. In the example illustrated in FIG. 5B, a geometric model MD12 corresponding to a neck and geometric models Md13 and Md14 each corresponding to a part from an ankle to an end of a leg are added to the object model illustrated in FIG. 5A. In this case, although illustration is omitted, with regard to a joint model to be used, joints are added to the joint model illustrated in FIG. 4.

A degree of freedom of the object model is rotation at between adjacent geometric models (that is a joint) (which will be hereinafter also referred to as joint rotation) and displacement of a geometric model itself. As the object model includes a degree of freedom of rotation at between adjacent geometric models, the object model is also referred to as "a link mechanism model with a geometric shape". A degree of freedom of the object model will be described in detail later.

Figure 6A:
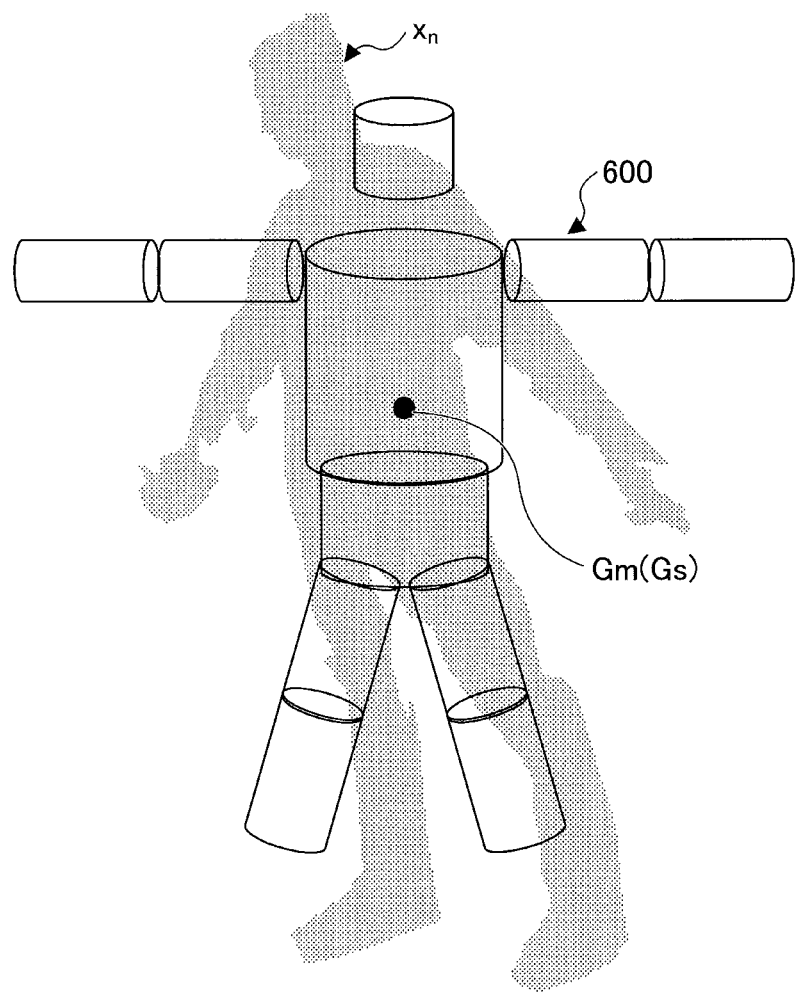
FIG. 6A is an explanatory drawing illustrating an example of a method for configuring an initial state.

The initial state configuring unit 122, as schematically illustrated in FIG. 6A, preferably configures a state, in which a centroid of the object model 600 matches a centroid of the point cloud data, and geometric models corresponding to left and right arm parts among multiple geometric models are open on each side, as an initial state. In FIG. 6A, a centroid $G_m$ of the object model 600 matches a centroid $G_s$ of the point cloud data $x_n$, and left and right arm parts are outstretched. A centroid of the object model used for configuring an initial state may be a centroid based on all geometric models included in the object model, and may be a centroid of a geometric model related to a specific part. A geometric model related to a specific part is a geometric model related to a lower back part (See the geometric model Md1 in FIG. 5A), for example. In a modified example, an initial state may include a state in which geometric models corresponding to left and right leg parts are open on each side.

Figures 6B, 7:
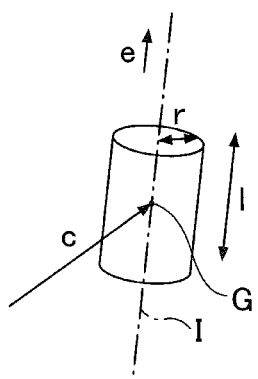
FIG. 6B is an explanatory drawing illustrating a parameter of a geometric model.
FIG. 7 is an explanatory drawing illustrating an example of point cloud data $x_n$.

The initial state of the object model may be represented by initial values of a position, a direction, thickness, and length of each geometric model included in the object model, for example. In the present embodiment, as an example, as illustrated in FIG. 6B, one geometric model is represented by a position c, a direction e, thickness r, and length l. The position c and the direction e are vectors, and the direction e is represented by a unit vector indicating a direction of an axis I of a cylinder. The position c is a position vector of a midpoint position G in a length direction on the axis I of the cylinder. Instead of the length l, equivalently, positions of a top end and a bottom end on the axis I of the cylinder (i.e., positions of joints) may be used.

The optimizing unit 124 performs fitting by an EM algorithm based on the point cloud data input to the data input unit 120 and the initial state of the object model generated by the initial state configuring unit 122. The initial state of the object model obtained by the initial state configuring unit 122 is used, because it is useful to provide an initial value close to a solution to some extent in the EM algorithm.

In the following, the position c, the direction e, the thickness r, and the length l of geometric models (which are cylinders here) for parts m (m=1, 2, . . . , M–h) of the object person S are represented as $c_m$, $e_m$, $r_m$, and $l_m$ respectively. Thus, a geometric model for a part m of the object person S is represented as four model parameters that are a position $c_m$, a direction $e_m$, thickness $r_m$, and length $l_m$. The part m of the object person S corresponds to bones from b1 to b15 (or parts from b1 to b15) in the object model. M is the number of all parts of the joint model (i.e. the total number of all parts including hidden parts), and M is 15 in the joint model illustrated in FIG. 4. "M–h" is used in order to exclude a part that does not contribute to the fitting. Thus, the part m indicates a part targeted for the fitting among all parts of the object person S. In the following, any given part among all parts of the object person S is represented by "a part k" when distinguishing.

The point cloud data $x_n$ is a set of N points (i.e., $x_1$, $x_2$, . . . $x_N$) represented by three-dimensional space coordinates (x, y, z) (e.g., a position vector). In this case, for example, x and y components of the spatial coordinates are values of two-dimensional coordinates of an image plane, and an x component is a horizontal component and a y component is a vertical component. A z component indicates distance. FIG. 7 illustrates an example of the point cloud data $x_n$. A parameter that represents joint rotation of the object model, rotation of centroid of the object model, and translation of a predetermined joint (which will be hereinafter referred to as "the root joint") of the object model, and also thickness r, and length l, is referred to as "the deformation parameter $\theta_{ar}$". The root joint is a joint on an ancestor side (or a root side) of one predetermined part of parts m (m=1, 2, . . . , M−h), and the predetermined part is a part that is not moved by joint rotation of another part. The root joint is a joint between a pelvis part and a trunk part (which is the joint a0 in FIG. 4) for example. The rotation of centroid of the object model is synonymous with rotation of the entire object model. Similarly, the translation of the root joint is synonymous with translation of the entire object model.

In the present embodiment, the surface residual $\varepsilon_m(x_n, \theta_{ar})$ (a difference in a direction perpendicular to a surface around an axis) between the point cloud data $x_n$ and the geometric model related to parts m is assumed to be a Gaussian distribution. Specifically, it is as described below.

$$p(x_n) = \frac{1}{(M-h)(2\pi\sigma^2)^{1/2}} \sum_{m=1}^{M-h} \exp\left(-\frac{\varepsilon_m(x_n, \theta_{ar})^2}{2\sigma^2}\right) \quad \text{[Eq. 1]}$$

Here, $p(x_n)$ is a probability distribution mixed model of the point cloud data $x_n$, and $\sigma^2$ is variance. The corresponding log-likelihood function is as described below.

$$E(\theta_{ar}, \sigma^2) = -\sum_{n=1}^{N} \ln \frac{1}{(M-h)(2\pi\sigma^2)^{1/2}} \sum_{m=1}^{M-h} \exp\left(-\frac{\varepsilon_m(x_n, \theta_{ar})^2}{2\sigma^2}\right) \quad \text{[Eq. 2]}$$

When a geometric model related to the part m is a cylinder, the surface residual $\varepsilon_m(x_n, \theta_{ar})$ is represented as follows. A sign "×" between vectors indicates a cross product.

$$\varepsilon_m(x_n, \theta) = |(x_n - e_m) \times e_m| - r_m$$

The EM algorithm is an iterative process of an E step that calculates an expected value and an M step that maximizes the expected value as it is known.

In the E step, the optimizing unit 124 calculates a posterior distribution $p_{nm}$ (an example of an index value) below.

$$p_{nm} = \frac{\exp(-\varepsilon_m(x_n, \theta_{ar})^2/2\sigma^2)}{\sum_{m=1}^{M-h} \exp(-\varepsilon_m(x_n, \theta_{ar})^2/2\sigma^2)} \quad \text{[Eq. 3]}$$

In the M step, the optimizing unit 124 derives a parameter $\theta_{ar}$ and variance $\sigma^2$ that maximize an expected value $Q(\theta_{ar}, \sigma^2)$ below. In the M step, the posterior distribution $p_{nm}$ is treated as a constant.

$$Q(\theta_{ar}, \sigma^2) = \frac{1}{2\sigma^2} \sum_{n=1}^{N} \sum_{m=1}^{M-h} p_{nm}\varepsilon_m(x_n, \theta_{ar})^2 + \frac{P}{2}\ln\sigma^2 \quad \text{[Eq. 4]}$$

Here, P is a sum of the posterior distribution $p_{nm}$ data for all parts (which will be hereinafter also referred to as the all parts sum of the posterior distribution $p_{nm}$ data), and P is as described below.

$$P = \sum_{n=1}^{N} \sum_{m=1}^{M-h} p_{nm} \quad \text{[Eq. 5]}$$

From a partial derivative of the variance $\sigma^2$ of the expected value $Q(\theta_{ar}, \sigma^2)$, an estimate value $\sigma^{2*}$ of the variance $\sigma^2$ that maximizes the expected value $Q(\theta_{ar}, \sigma^2)$ is as described below.

$$\sigma_*^2 = \frac{1}{P} \sum_{n=1}^{N} \sum_{m=1}^{M-h} p_{nm}\varepsilon_m(x_n, \theta_{ar})^2 \quad \text{[Eq. 6]}$$

Substituting the estimate value $\sigma^{2*}$ in Eq. 4, the following obtained.

$$Q(\theta_{ar}, \sigma^2) = \frac{P}{2}\left\{1 - \ln P + \ln \sum_{n=1}^{N} \sum_{m=1}^{M-h} p_{nm}\varepsilon_m(x_n, \theta_{ar})^2\right\} \quad \text{[Eq. 7]}$$

As thickness $r_m$ in the components of the parameter $\theta_{ar}$ is originally linear, an estimate value $r^*_m$ of the thickness $r_m$ can be directly minimized as described below.

$$r_{*m} = \frac{1}{\sum_{n=1}^{N} p_{nm}} \sum_{n=1}^{N} p_{nm}|(x_n - c_m) \times e_m| \quad \text{[Eq. 8]}$$

The expected value $Q(\theta_{ar}, \sigma^2)$ is a non-linear function with respect to the components other than the thickness $r_m$ in the components of the parameter $\theta_{ar}$, however an updating expression is calculated by a linear approximation with assuming an infinitesimal change in the present embodiment. A solution to a maximization problem of a likelihood function can be derived by a linear approximation as in the variance $\sigma^2$. Specifically, it is as described below for an infinitesimal change $\Delta\theta$ of the deformation parameter $\theta_{ar}$.

$$0 = \frac{\partial Q(\theta_{ar} + \Delta\theta, \sigma^2)}{\partial \Delta\theta} \simeq \frac{-1}{\sum_{n=1}^{N}\sum_{m=1}^{M-h} p_{nm}\varepsilon_m(x_n, \theta_{ar})^2} \langle \varepsilon_{nm}\varepsilon'_{nm} + \varepsilon'_{nm}\varepsilon'^T_{nm}\Delta\theta \rangle \quad \text{[Eq. 9]}$$

Thus, the infinitesimal change $\Delta\theta$ of the deformation parameter $\theta_{ar}$ is as described below by using the surface residual $\varepsilon_{nm}$ and the derivative $\varepsilon'_{nm}$ of the surface residual. In Eq. 10, $^T$ indicates transpose (the same applies hereinafter).

$$\Delta\theta = -\langle \varepsilon'_{nm}\varepsilon'^T_{nm}\rangle^{-1}\langle \varepsilon_{nm}\varepsilon'_{nm}\rangle \quad \text{[Eq. 10]}$$

The surface residual $\varepsilon_{nm}$ and the derivative $\varepsilon'nm$ of the surface residual are defined as described below. The $\theta_{ar}$ is a deformation parameter.

$$\varepsilon_{nm} \equiv \varepsilon_m(x_n, \theta_{ar}) \qquad [\text{Eq. 11}]$$

$$\varepsilon'_{nm} \equiv \frac{\partial \varepsilon_m(x_n, \theta_{ar})}{\partial \theta_{ar}}$$

An expression $\langle \ \rangle_p$ indicates a uniform operation using the posterior probability $p_{nm}$, and is as described below with respect to any given tensor or matrix $a_{nm}$.

$$\langle a_{nm} \rangle \equiv \sum_{n=1}^{N} \sum_{m=1}^{M-h} p_{nm} a_{nm} \qquad [\text{Eq. 12}]$$

A method of calculating the infinitesimal change $\Delta\theta$ based on the surface residual $\varepsilon_{nm}$ and the derivative $\varepsilon'nm$ of the surface residual can be achieved on a basis of forward kinematics using a mechanistic model as described below.

In the following, a position $c_m^\Theta$ and a direction $e_m^\Theta$ indicate a position and a direction of the geometric model related to the part m in a pose $\Theta$. The position $c_m^\Theta$ is a position of an ancestor side of the part m. When changes in the position $c_k^\Theta$ and the direction $e_k^\Theta$ caused by the infinitesimal change $\Delta\theta$ are $\Delta c_k^\Theta$ and $\Delta e_k^\Theta$ respectively, a position $c_k^{\Theta+\Delta\Theta}$ and direction $e_k^{\Theta+\Delta\Theta}$ after the change $\Delta c_k^\Theta$ and $\Delta e_k^\Theta$ are expressed as below respectively. The part k, as described above, includes hidden parts; thus the joint model illustrated in FIG. 4 is k=1, 2, . . . , 15. The direction $e_k^{\Theta+\Delta\Theta}$ is updated in a manner that preserves a norm.

$$c_k^{\Theta+\Delta\Theta} = c_k^\Theta + \Delta c_k^\Theta \qquad [\text{Eq. 13}]$$

$$e_k^{\Theta+\Delta\Theta} = e_k^\Theta + \Delta e_k^\Theta \times e_k^\Theta \qquad [\text{Eq. 14}]$$

Here, the $\Delta c_k^\Theta$ and $\Delta e_{k\Theta}$ have a relation below based on the forward kinematics of the mechanistic model.

$$\Delta c_k^\Theta = \sum_{k'=1}^{M} \chi_{kk'} \Delta l_{k'} e_{k'}^\Theta + \sum_{i=0,\times,\times\times} \sum_{l=1}^{M-f} \chi_{kl} \Delta \theta_{li} e_{li}^\Theta \times (c_k^\Theta - c_l^\Theta) + \sum_{i=0,\times,\times\times} \Delta\theta_{M-f+1,i} \hat{e}_i \times (c_k^\Theta - c_0) \qquad [\text{Eq. 15}]$$

$$\Delta e_k^\Theta = \sum_{i=0,\times,\times\times} \sum_{l=1}^{M-f} (\delta_{kl} + \chi_{kl}) \Delta\theta_{li} e_{li}^\Theta + \sum_{i=0,\times,\times\times} \Delta\theta_{M-f+1,i} \hat{e}_i \qquad [\text{Eq. 16}]$$

Here, $c_0$ is a position of the root joint. A subscript l indicates a movable part, and the total number is M−f (e.g., 13). f is the number of joints that are not movable. A joint that is not movable is a joint (See the joint a0 in FIG. 4) of a pelvis part (See the parts b14 and b15 in FIG. 4), for example. A $\Delta l_k$, $\Delta\theta_{li}$, $\Delta\theta_{M-f+1,i}$, and $\Delta\theta_{M-f+2,i}$ are components of the infinitesimal change $\Delta\theta$. The $\Delta l_k$ indicates a change in a direction of the part k (k=1, 2, . . . , M). The $\Delta\theta_{li}$ indicates joint rotation of an ancestor side (a root side) of the movable part l (l=1, 2, . . . , M−f), and the $\Delta\theta_{M-f+1,i}$ indicates rotation of centroid of the object model, and the $\Delta\theta_{M-f+2,i}$ indicates translation of the root joint (which is three-dimensional). A subscript represents a space dimension with respect to the $\Delta\theta_{M-f+2,i}$ (which is three-dimensional in the present embodiment, and i=1, 2, 3), and a freedom of rotation with respect to the other components such as the $\Delta\theta_{li}$ and the $\Delta\theta_{M-f+1,i}$ (which is three degrees in the present embodiment, and i=0, X, XX). An $e_{li}^\Theta$ (where i=0, X, XX) is a rotation axis of the movable part l in a pose $\Theta$, and is as described below.

$$e_{l0}^\Theta \equiv e_l^\Theta, \ e_{l\times}^\Theta \equiv \frac{n \times e_l^\Theta}{|n \times e_l^\Theta|}, \ e_{l\times\times}^\Theta \equiv \frac{e_l^\Theta \times (n \times e_l^\Theta)}{|e_l^\Theta \times n \times e_l^\Theta|} \qquad [\text{Eq. 17}]$$

n is any given unit vector (i.e., a fixed vector), and may be a unit vector related to a direction of the distance image sensor 21. Moreover, vectors that are used in Eq. 15 and Eq. 16 (similarly in Eq. 22 to Eq. 24 described later) are described as below.

$$\hat{e}_0 = \begin{pmatrix} 1 \\ 0 \\ 0 \end{pmatrix}, \hat{e}_\times = \begin{pmatrix} 0 \\ 1 \\ 0 \end{pmatrix}, \hat{e}_{\times\times} = \begin{pmatrix} 0 \\ 0 \\ 1 \end{pmatrix} \qquad [\text{Eq. 18}]$$

$\delta_{kl}$ used in Eq. 16 is a Kronecker delta, and is as described below.

$$\delta_{kl} = \begin{cases} 1 & k = l \\ 0 & \text{Otherwise} \end{cases} \qquad [\text{Eq. 19}]$$

Figure 8B:
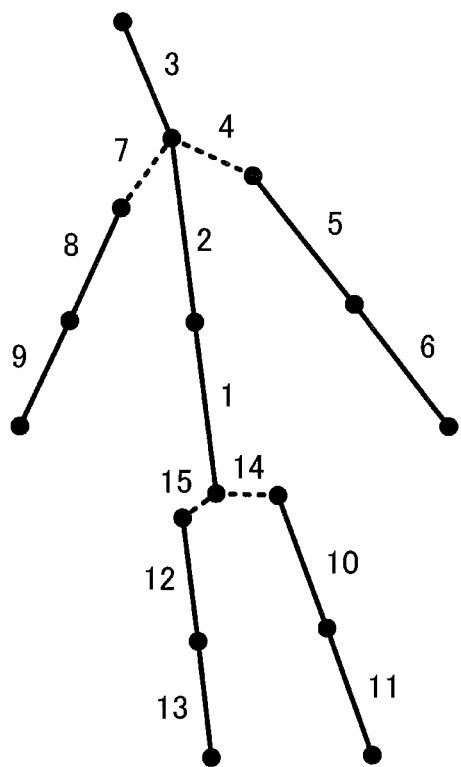
FIG. 8B is a drawing illustrating an example of assigning numbers to parts for an explanation of $\chi_{k1}$.

$\chi_{kl}$ is a parameter indicating an ancestor and descendant relation between the part k (k=1, 2, . . . , 15) and the movable part l (l=1, 2, . . . , 13), and is, for example, as illustrated in FIG. 8A. The number of a part in FIG. 8A is as illustrated in FIG. 8B. For example, when the part k is the part 6, and the part l is the part 5, the $\chi_{56}$ is equal to 1. This is because the part 5 is on the ancestor side of the part 6. In examples illustrated in FIG. 8A and FIG. 8B, the numbers of pelvis parts that are not movable are last two numbers "14" and "15", and are removed from the column. In a row and a column, the same number indicates the same part.

Here in summarizing a subscript notation, the subscript k indicates all parts, and the total number is M. The subscript m indicates parts targeted for fitting, and the total number is M−h. The subscript l indicates a movable part, and the total number is M−f. These subscripts do not necessarily indicate the same part with the same number.

When the geometric model is a cylinder, a surface residual may be expressed by a difference in a radial direction toward a surface around an axis (a cylindrical surface), as described above.

$$\varepsilon_m(x_n, \theta_{ar}) = |(x_n - c_m^\Theta) \times e_m^\Theta| - r_m$$

A derivative of the surface residual is described as below based on the forward kinematics of a mechanistic model (a relational expression of Eq. 15 and Eq. 16).

$$\frac{\partial \varepsilon_{nm}}{\partial \Delta l_k} = \chi_{mk} \left( e_m^\Theta \times \frac{(x_n - c_m^\Theta) \times e_m^\Theta}{|(x_n - c_m^\Theta) \times e_m^\Theta|} \right) \cdot e_k^\Theta \qquad [\text{Eq. 21}]$$

$$\frac{\partial \varepsilon_{nm}}{\partial \Delta \theta_{li}} = \chi_{\sigma(m)l} \left( e_m^\Theta \times \frac{(x_n - c_m^\Theta) \times e_m^\Theta}{|(x_n - c_m^\Theta) \times e_m^\Theta|} \right) \cdot \{e_{li}^\Theta \times (x_n - c_l^\theta)\} \qquad [\text{Eq. 22}]$$

$(l \leq M - f)$ $$\frac{\partial \varepsilon_{nm}}{\partial \Delta \theta_{M-f+1,i}} = \left( e_m^\Theta \times \frac{(x_n - c_m^\Theta) \times e_m^\Theta}{|(x_n - c_m^\Theta) \times e_m^\Theta|} \right) \cdot \{\hat{e}_i \times (x_n - c_0)\} \qquad [\text{Eq. 23}]$$

$$\frac{\partial \varepsilon_{nm}}{\partial \Delta \theta_{M-f+2,i}} = \left( e_m^\Theta \times \frac{(x_n - c_m^\Theta) \times e_m^\Theta}{|(x_n - c_m^\Theta) \times e_m^\Theta|} \right) \cdot \hat{e}_i \qquad [\text{Eq. 24}]$$

The $\Delta l_k$ indicates a change in length of the part k, and a derivative of the surface residual by $\Delta l_k$ is also expressed by "$\varepsilon'_{nm\Delta l}$". The $\Delta\theta_{li}$ indicates joint rotation of the movable part l as described above, and a derivative of the surface residual by $\Delta\theta_{li}$ is also expressed by "$\varepsilon'_{nmli}$". The $\Delta\theta_{nm,M-f+1,i}$ indicates rotation of centroid of the object model as described above, and a derivative of the surface residual by $\Delta\theta_{nm,M-f+1,i}$ is expressed by "$\varepsilon'_{nm,M-f+1,i}$". The $\Delta\theta_{nm,M-f+2,i}$ indicates translation (which is three dimensional) of a root joint as described above, and a derivative of the surface residual by $\Delta\theta_{nm,M-f+2,i}$ is expressed by "$\varepsilon'_{nm,M-f+2,i}$". $\chi_{mk}$ is as described below.

$$\chi_{mk} = \begin{cases} 1 & \text{When the park } k \text{ is an ancestor of the part } m \\ 0 & \text{Otherwise} \end{cases} \quad [\text{Eq. 25}]$$

$\chi_{mk}$ is a parameter indicating an ancestor and descendant relation between the part m and the part k. $\chi_{\sigma(m)l}$ is a parameter indicating an ancestor and descendant relation between a part $\sigma(m)$ of the part m and the movable part l (l=1, 2, . . . , 13). The part $\sigma(m)$ represents an adjacent part on a descendant side of the movable part l. With respect to the $\chi_{mk}$ and $\chi_{\sigma(m)l}$, the idea is substantially similar to the $\chi_{kl}$ of the part k and the movable part l, and is as described above with references of FIG. 8A and FIG. 8B.

The optimizing unit 124 can derive the $\Delta\theta_{li}$, the $\Delta\theta_{M-f+1,i}$, and the $\Delta\theta_{M-f+2,i}$ based on the equations of Eq. 22, Eq. 23 and Eq. 24, and Eq. 10 when the geometric model is a cylinder. In other words, the $\varepsilon'_{nmli}$ is a derivative of the surface residual for obtaining joint rotation $\Delta\theta_l$, from the equation in Eq. 10 described above. Similarly, the $\varepsilon'_{nm,M-f+1,i}$ is a derivative of the surface residual for obtaining $\Delta\theta_{M-f+1,i}$ from the equation in Eq. 10 described above. Similarly, the $\varepsilon'_{nm,M-f+2,i}$ is a derivative of the surface residual for obtaining $\Delta\theta_{M-f+2,i}$ from the equation in Eq. 10 described above. With respect to a geometric model other than a cylinder, the parameters can be derived by using a surface residual below similarly.

In the case of circular cone, a surface residual $\varepsilon_m(x_n, \theta_{ar})$ may be expressed as described below. In a circular cone (similarly in an elliptic cone), the position $c_m^\Theta$ corresponds to a vertex position in a pose $\Theta$, and the direction $e_m^\Theta$ in a pose $\Theta$ is a unit vector of a central axis.

$$\varepsilon_m(x_n,\theta_{ar}) = |(x_n - c_m^\Theta) \times e_m^\Theta||n_m \times e_m^\Theta| - (x_n - c_m^\Theta) \cdot e_m^\Theta n_m \cdot e_m^\Theta \quad [\text{Eq. 26}]$$

A vector $n_m$ is a normal vector at a point of a surface of a circular cone. The case of truncated cone may be treated similar to a cone.

For an elliptic cylinder, the residual of the surface $\varepsilon_m(x_n, \theta_{ar})$ may be expressed as described below.

$$\varepsilon_m(x_n, \theta_{ar}) = \frac{|(x_n - c_m^\Theta) \times e_m^\Theta - d_m n'_m| + |(x_n - c_m^\Theta) \times e_m^\Theta + d_m n'_m| - 2a_m}{\left| \frac{(x_n - c_m^\Theta) \times e_m^\Theta - d_m n'_m}{|(x_n - c_m^\Theta) \times e_m^\Theta - d_m n'_m|} + \frac{(x_n - c_m^\Theta) \times e_m^\Theta + d_m n'_m}{|(x_n - c_m^\Theta) \times e_m^\Theta + d_m n'_m|} \right|} \quad [\text{Eq. 27}]$$

$d_m$ is a focal distance, and $a_m$ is a major axis length of an ellipse of a cross section, and $n_m$ is a unit vector in a direction of a major axis. Similarly, a position $c_m$ corresponds to a position on an axis, and a direction $e_m$ is a unit vector of an axis of an elliptic cylinder (i.e., in an axis direction).

For an elliptic cone, the surface residual $\varepsilon_m(x_n, \theta_{ar})$ may be expressed as follows.

$$\varepsilon_m^2(x_n, \theta_{ar}) = \quad [\text{Eq. 28}]$$

$$|x_n - c_m^\Theta|^2 - \frac{\left\{ \frac{(x_n - c_m^\Theta) \cdot e_m^\Theta \cos\psi_{m1} + |(x_n - c_m^\Theta) \times e_m^\Theta|}{\sqrt{\sin^2\psi_{m1} - (\sin^2\psi_{m1} - \cos^2\psi_{m1}\tan^2\psi_{m2})\left(\frac{(x_n - c_m^\Theta) \times e_m^\Theta}{|(x_n - c_m^\Theta) \times e_m^\Theta|} \cdot n'_m\right)^2}} \right\}^2}{1 - (\sin^2\psi_{m1} - \cos^2\psi_{m1}\tan^2\psi_{m2})\left(\frac{(x_n - c_m^\Theta) \times e_m^\Theta}{|(x_n - c_m^\Theta) \times e_m^\Theta|} \cdot n'_m\right)^2}$$

Here, $\psi_{m1}$ and $\psi_{m2}$ are angles of slope in directions of a major axis and a minor axis respectively. Similarly, the position $c_m$ corresponds to a vertex position, and the direction $e_m$ is a unit vector of a central axis. For a truncated elliptic cone, the surface residual $\varepsilon_m(x_n, \theta_{ar})$ may be similar to an elliptic cone.

Obtaining the $\Delta l_k$, $\Delta\theta_{li}$, $\Delta\theta_{M-f+1,i}$, and $\Delta\theta_{M-f+2,i}$, the optimizing unit 124 may derive the $\Delta c_k^\Theta$ and $\Delta e_k^\Theta$ by substituting the $\Delta l_k$, $\Delta\theta_{li}$, $\Delta\theta_{M-f+1,i}$, and $\Delta\theta_{M-f+2,i}$ into Eq. 15 and Eq. 16. Obtaining the $\Delta c_k^\Theta$ and $\Delta e_k^\Theta$, the optimizing unit 124 may derive (or update) the position $c_k^{\Theta+\Delta\Theta}$ and the direction $e_k^{\Theta+\Delta\Theta}$ of the part k based on updating expressions from Eq. 13 to Eq. 16.

Alternatively, obtaining $\Delta l_k$, $\Delta\theta_{li}$, $\Delta\theta_{M-f+1,i}$, and $\Delta\theta_{M-f+2,i}$, the optimizing unit 124 may derive (or update) the position $c_k^{\Theta+\Delta\Theta}$ and the direction $e_k^{\Theta+\Delta\Theta}$ of the part k by using a rotation matrix (See FIG. 10B described later).

When the optimizing unit 124 obtains the variance $\sigma^2$ and the parameter $\theta_{ar}$ that maximize the expected value (i.e., an example of an optimized solution) by performing the M step as described, the optimizing unit 124 determines whether a convergent condition is satisfied, and repeats the E step when the convergent condition is not satisfied. The convergent condition is satisfied when change amount from a previous value of an optimized solution is less than or equal to predetermined change amount for example. A further example of the convergent condition will be described later. In the next E step, the optimizing unit 124 calculates a new posterior distribution $p_{nm}$ based on the object model after the infinitesimal change $\Delta\theta$ (i.e., the variance $\sigma^2$ and the parameter $\theta_{ar}$ in the last M step). In the next M step, similarly, the optimizing unit 124 derives the variance $\sigma^2$ and the parameter $\theta_{ar}$ that maximize the expected value based on the new posterior distribution $p_{nm}$.

The output unit 126 outputs the optimized solution obtained by the optimizing unit or information related to the object person S derived based on the optimized solution (an example of the object information). For example, the output unit 126 outputs bones information of the object person S to the display device 7 (See FIG. 1). For example, the output unit 126 may output bones information every frame period and approximately in real time. Alternatively, for commentary of movement of the object person S, for example, the output unit 126 may output bones information in time series and in non-real time.

Figure 9:
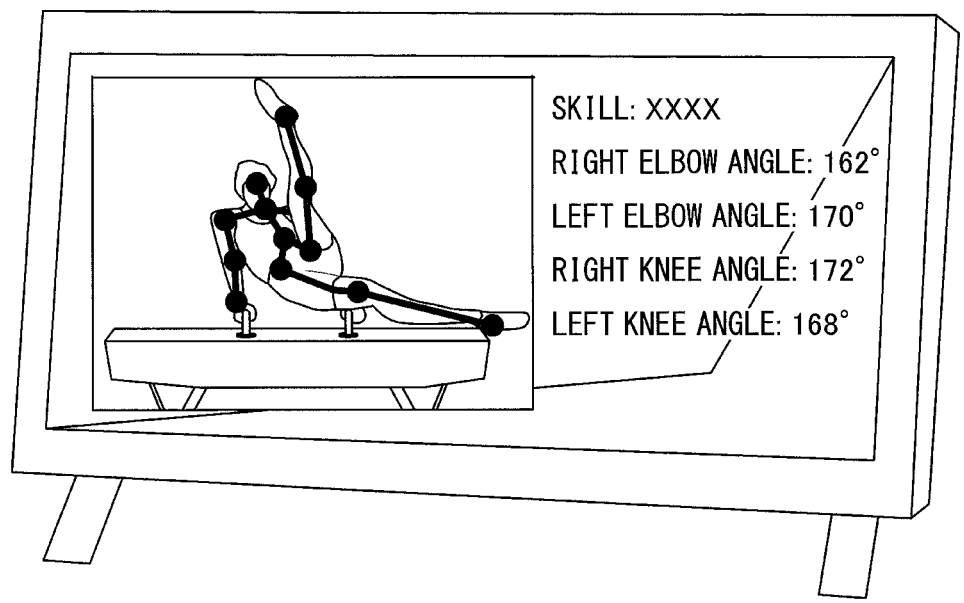
FIG. 9 is a drawing illustrating an example of an output.

The bones information may include information that can specify each position of the joints from a0 to a15. The bones information may include information that can specify each position, direction and thickness of the bones from b1 to b15. The bones information may be used as suited, and may be used for depriving the same bones information at next frame period. The bones information may be used for analysis of movement of the object person S at gymnastics competition finally. For example, analysis of movement of the object person S at gymnastics competition may achieve recognition of a "skill" based on the bones information. In FIG. 9, as an example, a display example is illustrated when the object person S is a gymnast. In the example illustrated in FIG. 9, in addition to a "skill", values of various angles (such as a right elbow angle) are quantified. Various angles are values derived based on the bones information of the object person S. As described above, according to the present embodiment, for example in gymnastics competition, as various angles can be quantified, a "skill" judgement, which has a limit in visual judgement, can be easily done by a grader.

As other uses of the bones information, the bones information may be used for a robot program by analyzing movement of the object person S that assumes a worker. The bones information can be used for a user interface by gesture, individual identification, and quantifying a skilled technique.

According to the present embodiment, as described above, the optimizing unit 124 generates the bones information of the object person S by performing fitting to fit the object model to the point cloud data $x_n$ with changing the object model infinitesimally. This can decrease a computation load compared with the related art described above that fits vertices of meshes to the point cloud data based on a distance between one point and another point (i.e., a distance between two points). Thus, in the present embodiment, the object model includes a significantly smaller number of geometric models than vertices of meshes, and a computation load can be greatly decreased. This enables the present embodiment to be applied to a fast and complex movement such as gymnastics and figure skating.

According to the present embodiment, compared with the related art described above that fits vertices of meshes to the point cloud data based on a distance between one point and another point, an accurate recognized result (i.e., the bones information) can be obtained with being robust to noise. For example, as shooting is not possible under strong light, the point cloud data may contain a relatively large amount of noise because of variations in lights. Specifically, in the prior art described above, a fitting error is a value obtained by dividing a data error caused by noise by the number N of the point cloud data, and an error of a mesh spacing in addition. In the present embodiment, a fitting error corresponds to a value obtained by dividing a data error caused by noise by the number N of the point cloud data, and no error of a mesh spacing.

According to the present embodiment, the EM algorithm searches for an optimized solution that minimizes the residual (i.e., the surface residual) of the point cloud data $x_n$ to the surface of the geometric model with changing the object model based on the forward kinematics using a mechanistic model. This can increase an accuracy of the optimized solution compared with searching for an optimized solution without being based on the forward kinematics using a mechanistic model. In the description above, the optimized solution is the variance $\sigma^2$ and the parameter $\theta_{ar}$, but may include an optimized solution of the object model type (i.e., an optimized type) as described later.

Thus, according to the present embodiment, when a state (e.g., a pose) of the object person S is recognized based on the point cloud data, a joint or a bone of an object can be accurately recognized with a relatively low computation load and with being robust to noise.

As the EM algorithm is an iterative calculation, the EM algorithm requires an initial state. In the present embodiment, as described above, a linear approximation is used in the M step, and an initial value close to a correct solution to some extent is useful. This is because a possibility of falling into a local maximum is increased when an initial state away from a correct solution is used.

According to the present embodiment, an initial state of the object model used in the EM algorithm is, as described above, a state in which a centroid of the object model matches a centroid of the point cloud data, and geometric models corresponding to left and right arm parts are open on each side. This can avoid a local maximum with a high probability in the EM algorithm.

In the M step, the expected value $Q(\theta_{ar},\sigma^2)$ is calculated with assuming an infinitesimal change, and it is useful that an infinitesimal change $\Delta\theta$ is "infinitesimal". Thus, in the present embodiment, it is preferable to introduce the following penalty term so that an infinitesimal change $\Delta\theta$ does not exceed an "infinitesimal" amount.

$$Q(\theta_{ar},\sigma^2) \rightarrow Q(\theta_{ar},\sigma^2)+w_r|\Delta\theta|^2 \qquad [\text{Eq. 29}]$$

Here, $W_r$ is a predetermined weight. Such a penalty term is called a regularization term, and has an effect to avoid numerical instability when a value is indeterminate because of data loss for example, in addition to a function described above (i.e., a function that an infinitesimal change $\Delta\theta$ does not exceed an "infinitesimal" amount).

Similarly, in the present embodiment, it is preferable to introduce the following penalty term so that a length and size are the same on the left and right. Thus, it is preferable to introduce a penalty term related to symmetry of the object model.

$$Q(\theta_{ar},\sigma^2) \rightarrow Q(\theta_{ar},\sigma^2)+w_{sl}\Sigma_i(l_{iR}-l_{iL})^2+w_{sr}\Sigma_i(r_{iR}-r_{iL})^2 \qquad [\text{Eq. 30}]$$

Here, each of $w_{sl}$ and $w_{sr}$ is a predetermined weight. i represents a part that exists on the left and right (i.e., an arm part and a leg part), and an $l_{iR}$ and $r_{iR}$ represent a right length and a right radius, and an $l_{iL}$ and $r_{iL}$ represent a left length and a left radius. In a geometric model related to an elliptic cylinder, for example, when thickness is represented by multiple thickness parameters such as a major radius and minor radius, a penalty term may be introduced for each parameter. A penalty term related to symmetry may be introduced with the regularization term described above.

Similarly, in the present embodiment, when a geometric model formulated as an infinite length such as a cylinder and an elliptic cylinder is used, the optimizing unit 124 preferably performs a finite length processing in the E step. The finite length processing is processing that calculates a posterior distribution $p_{nm}$ of only data satisfying a predetermined condition among the point cloud data $x_n$, and sets a posterior distribution $p_{nm}$ of other data to 0. The finite length processing is a processing for avoiding to mix data unrelated to the part m, and a predetermined condition is configured so that the data unrelated to the part m can be eliminated. This can prevent an analysis from being influenced by point cloud data that should be actually unrelated. The data that satisfies a predetermined condition may be data that satisfies the following equation for example.

$$0<(x_n-c_m^\Theta)\cdot e_m^\Theta<l_{(m)th} \qquad [\text{Eq. 31}]$$

For data whose length in an axis direction from a center of a geometric model related to the part m (or a center position, and the same applies hereinafter) is greater than or equal to a predetermined length (i.e., $l_{(m)th}$) among the point cloud data, a posterior distribution is set to 0. The predetermined length $l_{(m)th}$ can be input manually, or may be configured based on shape information of the object person S obtained by another measurement.

In the embodiment described above, although formulation assumes that all the point cloud data $x_n$ exists near a surface of a geometric model, the point cloud data $x_n$ includes noise and the like. If such data apart from a surface is mixed, a posterior distribution in the E step might not be correctly calculated because of numerical instability. Thus, as below, a uniform distribution may be added to the distribution $p(x_n)$ as a noise term.

$$p(x_n) = \frac{1-u}{M'(2\pi\sigma^2)^{1/2}} \sum_{m=1}^{M'} \exp\left(-\frac{\varepsilon_m(x_n, \theta)^2}{2\sigma^2}\right) + \frac{u}{N} \quad \text{[Eq. 32]}$$

Here, u is any given weight. The posterior distribution is modified as below.

$$p_{nm} = \frac{\exp(-\varepsilon_m(x_n, \theta)^2/2\sigma^2)}{\sum_{m=1}^{M'} \exp(-\varepsilon_m(x_n, \theta)^2/2\sigma^2) + u_c} \quad \text{[Eq. 33]}$$

Here, $u_c$ is defined as below.

$$u_c \equiv (2\pi\sigma^2)^{1/2} uM'/(1-u)N \quad \text{[Eq. 34]}$$

This introduces the $u_c$ in the denominator, and resolves numerical instability. Only the E step is modified, and the M step is not necessarily modified.

In the embodiment described above, for the surface residual $\varepsilon_m(x_n, \theta_{ar})$ between the point cloud data $x_n$ and the geometric model related to parts m, each part m is not weighted, but each part m may be weighted. This is in consideration of a difference in the number of the point cloud data explained by each geometric model. Specifically, a probability distribution mixed model of the point cloud data $x_n$ may be expressed as below. In Eq. 35, a uniform distribution is added as a noise term, but may be omitted.

$$p(x_n) = \frac{1-u}{(M-h)(2\pi\sigma^2)^{1/2}} \sum_{m=1}^{M-h} \alpha_m \exp\left(-\frac{\varepsilon_m(x_n, \theta)^2}{2\sigma^2}\right) + \frac{u}{N} \quad \text{[Eq. 35]}$$

Here, $\alpha_m$ is a weight related to the part m. $\alpha_m$ may be configured such that the greater the amount of point cloud data described by a corresponding geometric model is, the larger $\alpha_m$ is. For example, $\alpha_m$ is the following.

$\alpha_m$=surface area of the part m/entire surface area

The surface area of the part m may be a surface area of a geometric model related to the part m, and the entire surface area may be a surface area of the entire object model. In this case, the surface area is an area of a surface related to a surface residual, of a surface area of a geometric model. For example, for a geometric model related to a cylinder, it is surface area of a surface other than edge surfaces in an axis direction (i.e., an outer surface). This can model more precisely by reflecting the size of each part m of the object person S. In this case, the posterior distribution $p_{nm}$ is the following.

$$p_{nm} = \frac{\alpha_m \exp(-\varepsilon_m(x_n, \theta_{ar})^2/2\sigma^2)}{\sum_{m=1}^{M-h} \alpha_m \exp(-\varepsilon_m(x_n, \theta_{ar})^2/2\sigma^2) + (2\pi\sigma^2)^{1/2} u/(1-u)N} \quad \text{[Eq. 36]}$$

Next, with referring to brief flowcharts illustrated in FIG. 10A and the subsequent drawings, an operation example of the object recognition apparatus 100 according to the present embodiment will be described.

Figure 10A:
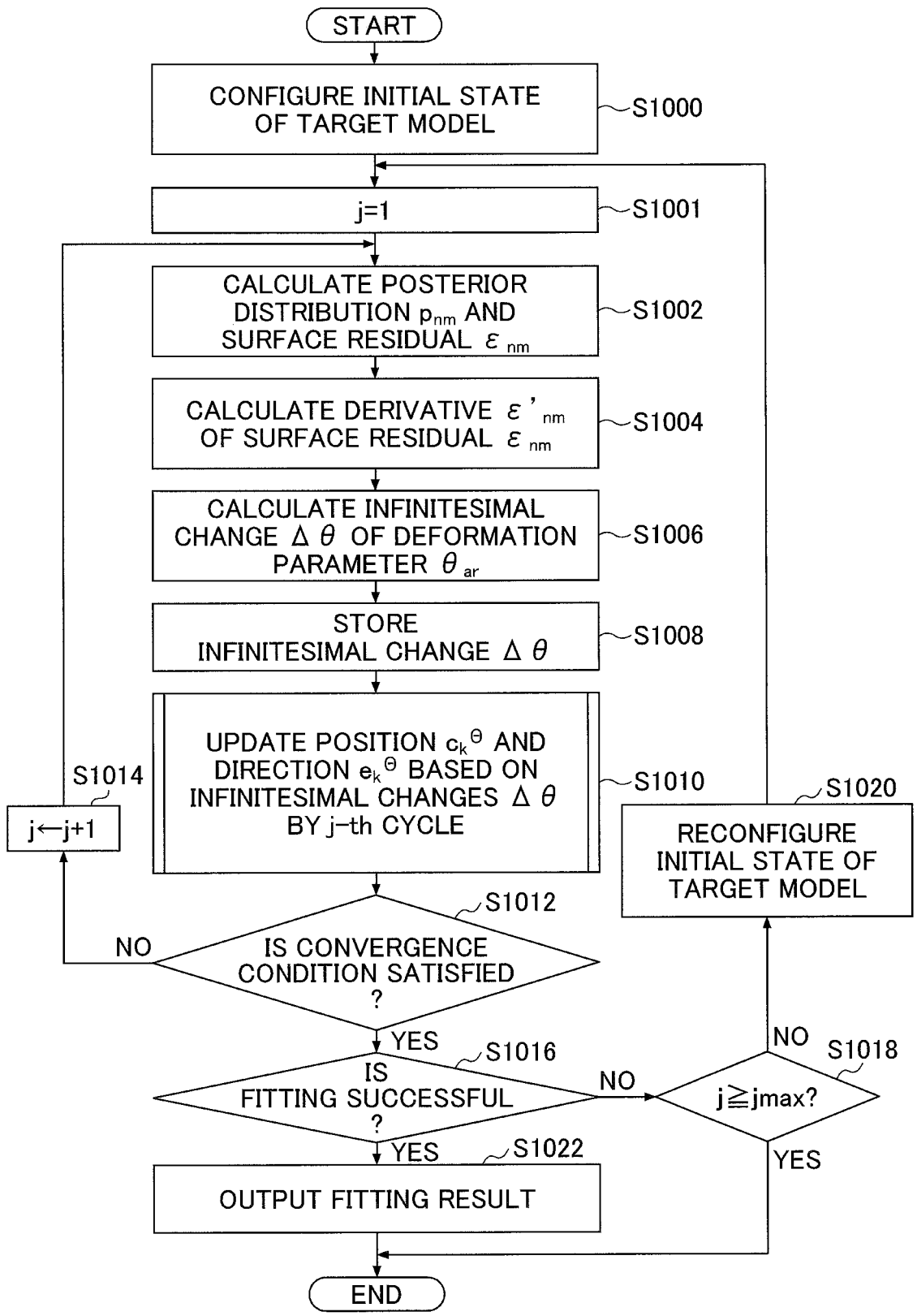
FIG. 10A is a flowchart illustrating an example of a process performed by an object recognition apparatus.

FIG. 10A is a flowchart illustrating an example of a process performed by the object recognition apparatus 100. A process illustrated in FIG. 10A may be performed every time when the data input unit 120 obtains the point cloud data related to 1 scene (or 1 time point) (i.e., every frame period). Alternatively, an optimizing process illustrated in FIG. 10A may be performed offline for the point cloud data related to each scene among the point cloud data related to multiple scenes obtained by the data input unit 120.

In step S1000, the initial state configuring unit 122 configures an initial state of the object model. A method of configuring an initial state of the object model is as described above.

In step S1001, the optimizing unit 124 sets j to 1.

In step S1002, the optimizing unit 124 calculates the posterior distribution $p_{nm}$ and the surface residual $\varepsilon_{nm}$. A method of calculating the posterior distribution $p_{nm}$ and the surface residual $\varepsilon_{nm}$ is as described above. When j=1, the posterior distribution $p_{nm}$ and the surface residual $\varepsilon_{nm}$ are calculated based on an initial state of the object model. In this case, for the variance $\sigma^2$, a suitable value may be used. When j≥2, the posterior distribution $p_{nm}$ and the surface residual $\varepsilon_{nm}$ are calculated based on the variance $\sigma^2$, the parameter $\theta_{ar}$, the position $c_k^{\Theta+\Delta\Theta}$ and the direction $e_k^{\Theta\Delta\Theta}$ that are obtained in the previous M step.

In step S1004, the optimizing unit 124 calculates the derivative $\varepsilon'_{nm}$ of the surface residual $\varepsilon_{nm}$. Thus, the optimizing unit 124 calculates $\varepsilon'_{nm\Delta l}$, $\varepsilon'_{nmli}$, $\varepsilon'_{nm,M-f+1,i}$, and $\varepsilon'_{nm,M-f+2,i}$ described above. A method of calculating $\varepsilon'_{nm\Delta 1}$, $\varepsilon'_{nmli}$, $\varepsilon'_{nm,M-f+1,i}$, and $\varepsilon'_{nm,M-f+2,i}$ is as described above.

In step S1006, the optimizing unit 124 calculates the infinitesimal change $\Delta\theta$ of the deformation parameter $\theta_{ar}$ based on the derivative $\varepsilon'^{nm}$ of the surface residual $\varepsilon_{nm}$ obtained in step S1004 and the posterior distribution $p_{nm}$ and the surface residual $\varepsilon_{nm}$ obtained in step S1002. The infinitesimal change $\Delta\theta$ includes $\Delta l_k$, $\Delta\theta_{li}$, $\Delta\theta_{M-f+1,i}$, and $\Delta\Theta_{M-f+2,i}$ as described above, and a calculation method is as described above.

In step S1008, the optimizing unit 124 stores the infinitesimal change $\Delta\theta$ of the j-th period obtained in step S1006 (which will be represented as $\Delta\theta$ (j) below).

In step S1010, the optimizing unit 124 performs an updating process to update the position $c_k^\Theta$ and the direction $e_k^\Theta$ based on the infinitesimal change $\Delta\theta$ obtained up to the j-th period. The updating process may be performed based on the updating expressions from Eq. 13 to Eq. 16 as described above, and a preferable example of the updating process will be described by using FIG. 10B.

In step S1012, the optimizing unit 124 determines whether a convergent condition is satisfied. The convergent condition may be satisfied when a maximum value among components of the infinitesimal change $\Delta\theta(j)$ of the j-th period (i.e., an example of a change amount from a previous value of an optimized solution) is smaller than or equal to a predetermined value. When the convergent condition is satisfied, the process moves to step S1016, and otherwise, the process returns to step S1002 through step S1014.

In step S1014, the optimizing unit 124 increments the j only by "1".

In step S1016, the optimizing unit 124 determines whether fitting is successful. For example, the optimizing unit 124 determines that fitting is successful when the all parts data sum of the posterior distribution $p_{nm}$ based on the data sum of the posterior distribution $p_{nm}$ of each part is greater than a predetermined value Th1 (an example of a predetermined threshold). The predetermined Th1 may be determined in accordance with a required fitting accuracy. When the determined result is "YES", the process moves to step S1022, and otherwise, the process moves to step S1018.

In step S1018, the optimizing unit 124 determines whether j≥jmax. The jmax is an upper limit for avoiding an infinite loop. When the determined result is "YES", the process ends, and otherwise, the process returns to step S1001 through step S1020.

In step S1020, the optimizing unit 124 reconfigures an initial state of the object model. Reconfiguring an initial state of the object model includes relatively large changes (e.g., double or half) of the length l and the thickness r of each geometric model. Reconfiguring an initial state of the object model may further include inverting or rotating by 90 degrees the vertical direction of the object model. This can increase possibility of avoiding a local maximum after the reconfiguration even when an initial state before the reconfiguration is away from a correct solution. In a modified example, step S1020 may be omitted. In this case, when the determined result in step S1018 is "NO", the object model creation fails.

In step S1022, the output unit 126 outputs a fitting result that is determined to be successful in step S1016 (e.g., bones information such as the position $c_k^\Theta$ and the direction $e_k^\Theta$).

According to the process illustrated in FIG. 10A, the process can search for an optimal parameter $\Theta_{ar}$ efficiently with repeating an infinitesimal change $\Delta\theta$ of the parameter $\theta_{ar}$ from an initial state of the object model until the convergent condition is satisfied for each scene.

In the process illustrated in FIG. 10A, processing is independently performed on each scene, but an initial state of the object model related to a current scene may be configured based on the position $c_k^\Theta$ and the direction $e_k^\Theta$ related to a previous scene or the optimal parameter $\theta_{ar}$ related to a previous scene.

Figure 10B:
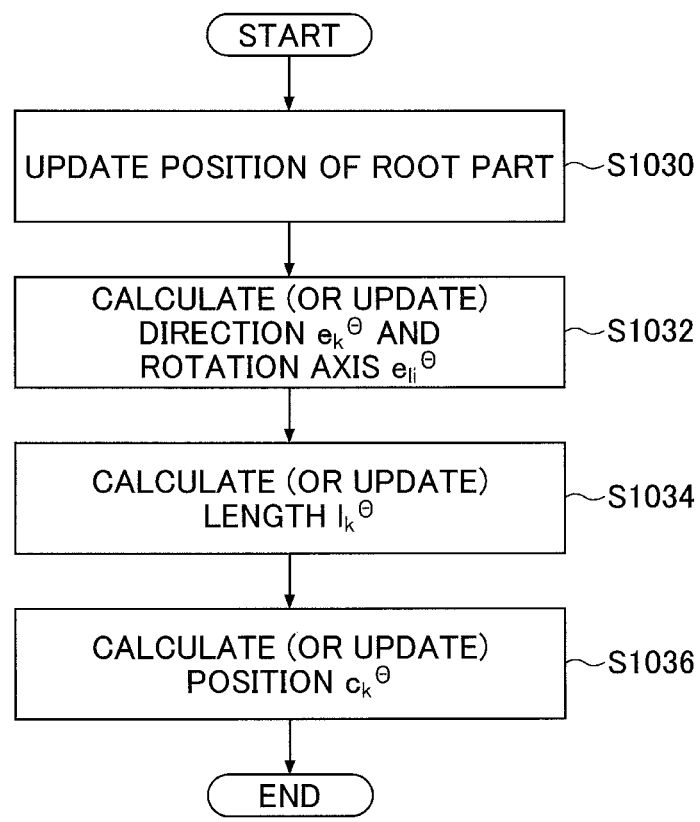
FIG. 10B is a flowchart illustrating an example of an updating process.

FIG. 10B is a flowchart illustrating an example of an updating process performed in step S1010 of FIG. 10A.

In step S1030, the optimizing unit 124 updates the root joint position $c_0$ based on the root joint translation $\Delta\theta_{M-f+2,i}$ of the infinitesimal change $\Delta\theta(j)$ obtained in step S1008. Specifically, this is as described below.

$c_0(j)=c_0(j-1)+\Delta\theta_{M-f+2,i}$

The $c_0(j)$ is a current value (i.e., a value at the j-th period), and $c_0(j-1)$ is a previous value (i.e., a value at the (j−1)-th period).

In step S1032, the optimizing unit 124 calculates a new direction $e_k^\Theta(j)$ and rotation axis $e_{li}^\Theta$ of the part k based on the joint rotation $\Delta\theta_{li}(j)$ and the centroid rotation $\Delta\theta_{M-f+1,i}$ of the infinitesimal change $\Delta\theta(j)$ obtained in step S1008. In this case, the centroid rotation and all the affected joint rotations are applied to each part k. Thus, with respect to a part k, in a direction toward an ancestor side, rotation matrices are multiplied from a rotation matrix of the adjacent part to a rotation matrix of the root part, and a rotation matrix of the centroid is multiplied at the end. Specifically, by using Rodrigues' formula as a rotation matrix for example, a rotation matrix for the part k is represented as $R_k$, and a transformation matrix $M_k$ can be represented as below.

$M_k=R_G R_0 R_1 \ldots R_j R_k$ $R_g$ is a rotation matrix of the centroid, and $R_0$ is a rotation matrix of the root joint. $R_1$ is a rotation matrix of a part directly connected to the root joint (which will be hereinafter also referred to as a root joint forming part), and the same continues (which is represented by " . . . "), and last $R_j$ is a rotation matrix of a part adjacent to the part k on an ancestor side. When the part k is a root joint forming part (e.g., the parts b1, b14, and b15 illustrated in FIG. 4), $R_1$, $R_j$ and rotation matrices between $R_1$ and $R_j$ does not exist, and the transformation matrix $M_k$ related to the part k is as below.

$M_k=R_G R_0$

The new direction $e_k^\Theta(j)$ can be calculated based on the transformation matrix $M_k$ related to the part k as below.

$e_k^\Theta(j)=M_k e_k(1)$

Here, the $e_k(1)$ is a direction of the part k in an initial state of the object model based on the transformation matrix $M_k$ related to the part k.

The new rotation axis $e_{li}^\Theta(j)$ can be calculated as below.

$e_{li}^\Theta(j)=M_k e_{li}(1)$

In Rodrigues' formula, generally, the rotation matrix $R_l$ of the part l for rotating only $\gamma_l$ around a combining axis of the rotation axis $e_{li}$ is the following.

$$R_l = 1 + \omega_l \sin\gamma_l + \omega_l^2(1-\cos\gamma_l) \qquad [\text{Eq. 37}]$$

$$\gamma_l = \sqrt{\sum_i \gamma_{li}^2},$$

$$\omega_l = \sum_i \frac{\gamma_{li}}{\gamma_l}\omega_{li}, \; \omega_{li} = \begin{pmatrix} 0 & -e_{liz} & e_{liy} \\ e_{liz} & 0 & -e_{lix} \\ -e_{liy} & e_{lix} & 0 \end{pmatrix}$$

The subscript i here represents a degree of freedom (i=0, X, XX). The $e_{lix}$, $e_{liy}$, and $e_{liz}$ are components of a unit vector of the rotation axis $e_{li}$, and with respect to the movable part l, the rotation axis $e_{li}^\Theta(1)$ in an initial state of the object model is used. The $\gamma_{li}$ is a rotation angle around the rotation axis $e_{li}$. The $\gamma_{li}$ related to the movable part l can be derived by summing up, from an initial state, each $\Delta\theta_{li}$ among the infinitesimal changes $\Delta\theta$ obtained up to the j-th period. Specifically, it is as below.

$$\gamma_{li} = \sum_{j'=1}^{j} \Delta\theta_{li}(j') \qquad [\text{Eq. 38}]$$

A $\Delta\theta_{li}(j')$ represents a $\Delta\theta_{li}$ obtained at the j'-th period. The centroid rotation matrix $R_G$ can be derived by using the centroid rotation $\Delta\theta_{M-f+1,1}$ instead of $\Delta\theta_{li}$.

In step S1034, the optimizing unit 124 updates the length $l_k^\Theta$ of the part k based on $\Delta l_k$ of the infinitesimal change $\Delta\theta(j)$ obtained in step S1008. Updating the length $l_{k\Theta}$ of the part k can be achieved as below.

$l_k^\Theta(j)=l_k^\Theta(j-1)+\Delta l_k$

In step S1036, the optimizing unit 124 updates the position $c_k^\Theta$ of the part k based on the root joint position $c_0$ updated in step S1030, the direction $e_k^\ominus(j)$ of the part k updated in step S1032, and the length $l_k^\ominus(j)$ of the part k updated in step S1034. The part k whose position is to be updated is a part other than the root joint forming part. The position $c_k(j)$ of the part k is determined geometrically based on the root joint position, the direction $e_k^\ominus(j)$ of the part k, and the direction $l_k^\ominus(j)$ of the part k.

According to the process illustrated in FIG. 10B, the position $c_k^\ominus$ of a part other than the root joint forming part of part k is updated based on the root joint position, the joint rotation, and the centroid rotation. The direction $e_k^\ominus$ of each part is updated based on a rotation matrix of the centroid and a rotation matrix of the root joint. This can update the position $c_k^\ominus$ more accurately compared with updating the position $c_k^\ominus$ and the direction $e_k^\ominus$ of the part k based on updating expressions from Eq. 13 to Eq. 16.

Figure 11:
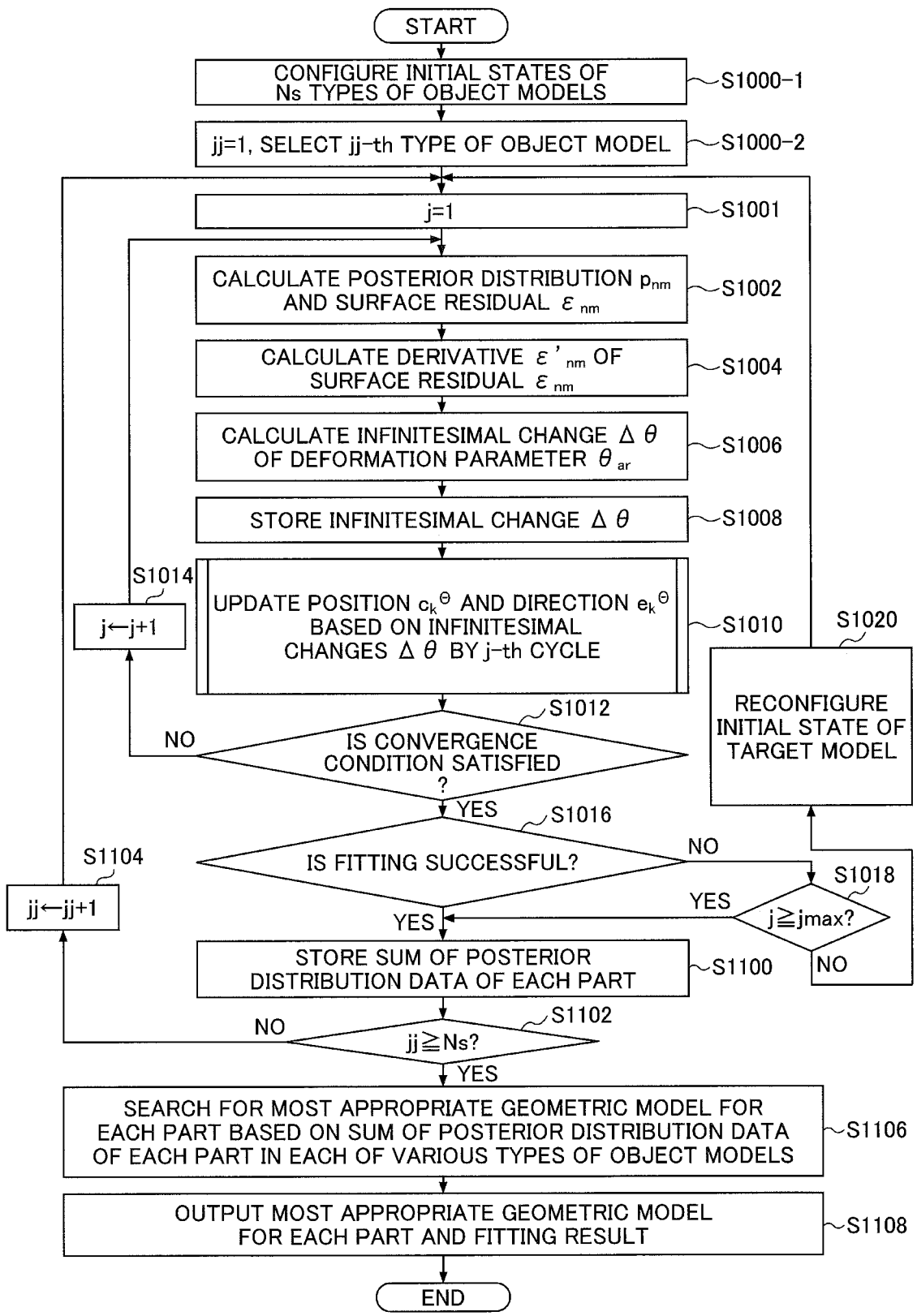
FIG. 11 is a flowchart illustrating another example of a process performed by an object recognition apparatus.

FIG. 11 is a flowchart illustrating another example of a process performed by an object recognition apparatus 100. The process illustrated in FIG. 11 may be performed as an alternative to the process illustrated in FIG. 10A.

The process illustrated in FIG. 11 is different from the process illustrated in FIG. 10A in that step S1000 is replaced by step S1000-1 and step S1000-2, and step S1100 to step S1108 are added. In the process illustrated in FIG. 11, when a determined result in step S1018 is "YES", the process does not end and moves to step S1100.

In step S1000-1, the initial state configuring unit 122 configures an initial state for each type based on multiple types (e.g., Ns types in FIG. 11) of the object models. A method of configuring an initial state of the object model is as described above. The multiple types of the object models indicate object models that are different in combining geometric models related to a cylinder, a cone, a truncated cone, an elliptic cylinder, an elliptic cone, and a truncated elliptic cone. In the present embodiment, as an example, the initial state configuring unit 122 uses six types of the object models from the type 1 to the type 6, and, for example, the type 1 is formed only by a geometric model related to a cylinder and the type 2 is formed only by a geometric model related to a cone.

In step S1000-2, the optimizing unit 124 sets a jj to 1, and selects the object model related to the first type (i.e., the type 1). Step S1001 to step S1020, and step S1100 are performed on the object model related to the jj-th type.

In step S1100, the optimizing unit 124 stores a data sum of the posterior distribution $p_{nm}$ of each part with respect to the object model related to the jj-th type. In FIG. 12, an example of a calculation result of the posterior distribution $p_{nm}$ with respect to the object model related to a type is illustrated by a table. In FIG. 12, numbers in squares are values of the posterior distribution $p_{nm}$, and vertical elements indicate n (i.e., "n" of the point cloud data $x_n$), and horizontal elements indicate m (i.e., "m" of the part m). As described, the posterior distribution $p_{nm}$, is a value that corresponds to each part m for each point of the point cloud data $x_n$. A sum of numbers in a horizontal direction is "1". The optimizing unit 124 can calculate a sum of the posterior distribution $p_{nm}$ data of each part by summing up numbers in a vertical direction.

In step S1102, the optimizing unit 124 determines whether $jj \geq N_s$. $N_s$ is the number of multiple types of the object models (i.e., the number of types), and is six in the present embodiment. When a determined result is "YES", the process moves to step S1106, and otherwise, the process returns to step S1001 through step S1014.

In step S1104, the optimizing unit 124 increments the jj only by "1", and selects the object model related to the jj-th type. In this case, subsequent steps S1001 to S1020 and step S1100 are similarly performed on the object model related to the jj-th type.

In step S1106, based on the data sum of the posterior distribution for each part (i.e., the data sum for each type of the object model) stored in step S1100, the optimizing unit 124 selects a type of the object model that maximizes the data sum for each part. For example, with respect to a lower back part, the optimizing unit 124 selects a type of the object model that maximizes the data sum of the posterior distribution related to a lower back part among six types of the object models. The optimizing unit 124 determines a geometric model that forms the object model of the selected type (i.e., one of geometric models related to a cylinder, a cone, a truncated cone, an elliptic cylinder, an elliptic cone, and a truncated elliptic cone) as an optimal type geometric model related to a lower back part. Thus, the optimizing unit 124 searches for an optimal type geometric model for each part based on an object model type that maximizes the data sum for each part.

In Step S1108, the output unit 126 outputs the geometric model of the type selected in step S1106 for each part, and outputs a fitting result obtained based on the geometric model of the type selected in step S1106. The fitting result is bones information such as the position $c_k^\ominus$ and the direction $e_k^\ominus$.

According to the process illustrated in FIG. 11, based on the fitting result of the object models of the multiple types, an optimal type geometric model can be determined for each part. As a result, the object model including an optimal type geometric model for each part can be generated.

The process illustrated in FIG. 11 is independently performed for each object model type, but based on the position $c_k^\ominus$ and the direction $e_k^\ominus$ related to an initial type object model related to a scene, an initial state of a next type object model related to the scene may be configured. Thus, when $jj \geq 2$, the initial state configuring unit 122 may configure an initial state of the object model based on the position $c_k^\ominus$ and the direction $e_k^\ominus$ when jj=1. It is not necessary to optimize a type of the geometric model forming the object model every scene, and for example, a type of the geometric model is optimized only for a first scene, and the optimized object model may be used continuously for subsequent scenes.

In the process illustrated in FIG. 11, the object model illustrated in FIG. 5A is used, but a different number of the geometric models as illustrated in FIG. 5B may be used as candidates. Thus, the object models of the multiple types may include not only the object model illustrated in FIG. 5A but also the geometric models illustrated in FIG. 5B.

FIG. 13 is an explanatory drawing illustrating a fitting result. In FIG. 13, as a fitting result, a geometric model type (i.e., an optimal type geometric model), a joint angle, length l, and thickness r are corresponded to each part. A joint angle is a parameter with respect to the position $c_k^\ominus$ as described above, and has a value for each of front and back, and left and right in FIG. 13. There is no geometric model type, for example, corresponding to the part "right collarbone" because it is a hidden part in FIG. 13 ("a diagonal line" indicates no data). The geometric model related to an elliptic cylinder corresponds to the parts "lower back" and "trunk" as an optimal type geometric model. In this case, thickness has a value for each of length of a major axis and length of a minor axis. For the geometric model related to a cylinder, thickness has one value of a radius.

Figure 14A:
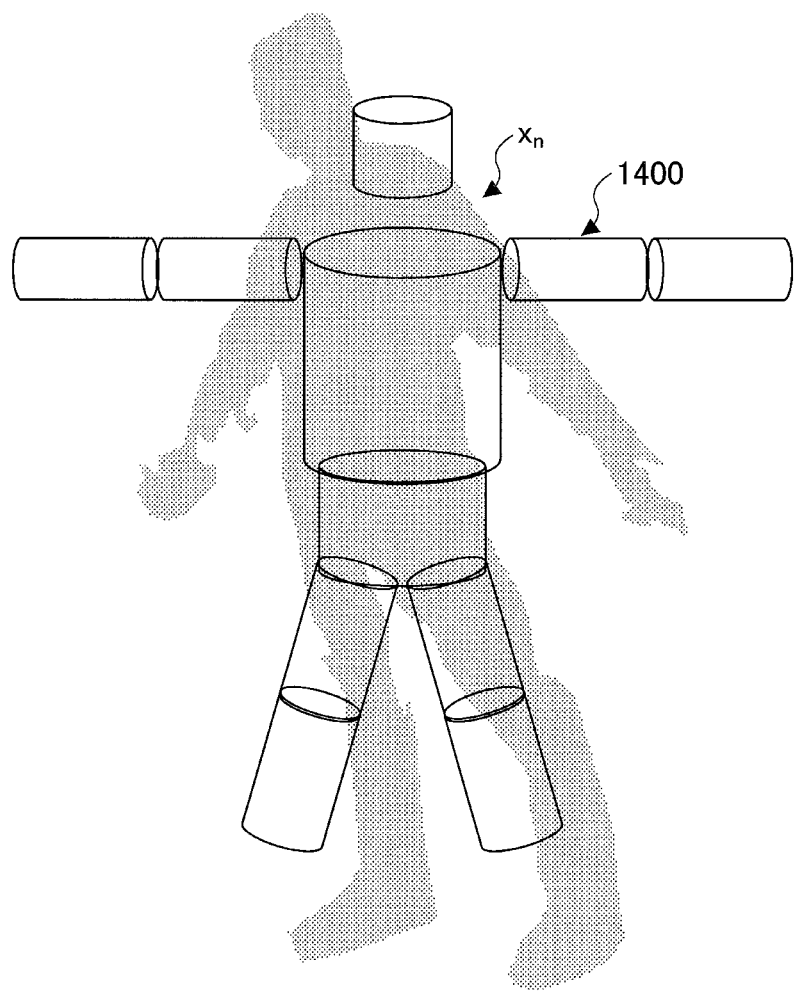
FIG. 14A is an explanatory drawing illustrating a fitting result.
Figure 14B:
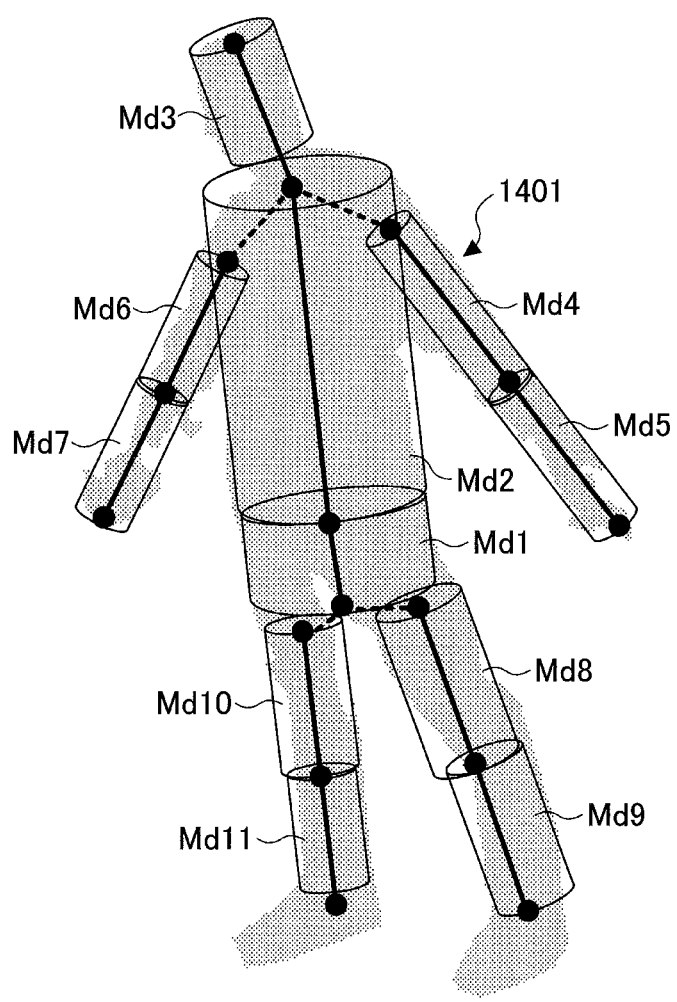
FIG. 14B is an explanatory drawing illustrating a fitting result.

FIG. 14A and FIG. 14B are explanatory drawings illustrating a fitting result. FIG. 14A schematically illustrates a relation between an object model 1400 in an initial state and the point cloud data $x_n$, and FIG. 14B schematically illustrates a relation between an object model formed by a combination of optimal type geometric models and the point cloud data $x_n$. In FIG. 14B, the geometric model related to an elliptic cylinder corresponds to the parts "lower back" and "trunk" (See Md1 and Md2) as an optimal type geometric model, and the geometric model related to a cylinder corresponds to the other parts as an optimal type geometric model.

As described above, the embodiments have been described in detail, however, they are not limited to specific embodiments and various modifications and changes may be made without departing from the scope of the claims. All or a plurality of elements of the embodiments described above may be combined.

For example, in the embodiment described above, the initial state configuring unit 122 may perform clustering of the point cloud data that is input to the data input unit 120, and obtain an initial fitting result by fitting for each cluster. In this case, the initial state configuring unit 122 may configure an initial state based on the initial fitting result. As a clustering method, the k-means++ method can be used, for example. The number of clusters that is given to the initial state configuring unit 122 may be input manually, and may be a predetermined number in accordance with a bones model. A predetermined number in accordance with a bones model is, for example, a value obtained by subtracting the number of parts of hidden bones from the total number of parts of a bones model. Thus, for the 16 joints model (i.e., 15 parts) illustrated in FIG. 4, a predetermined number, which is the first number of clusters, is "11" as four parts are hidden bones.

In the embodiment described above, the initial state configuring unit 122 may configure an initial state by using a machine learning unit. In this case, the machine learning unit performs labeling (or part recognition) on 15 parts based on the point cloud data that is input to the data input unit 120. As a machine learning method, random forest may be used, and as a feature variable, a difference in a distance value between a target pixel and a surrounding pixel may be used. Further, a method of performing multi-class classification of each pixel by using a distance image as an input may be used. When random forest is used, a feature variable other than a difference in a distance value may be used, and deep learning, which performs learning including a parameter corresponding to a feature variable, may be used.

In the embodiment described above, as an example, all joints have three degrees of freedom like a spheroid joint. For example, it is assumed that all joints can rotate around an axis, swing vertically, and swing horizontally like a shoulder and a hip joint. However, there are joints whose degree of freedom is limited actually. For example, an elbow has only one degree of freedom. In this point, it is difficult to identify a movable axis of a part close to axial symmetry. Thus, in the present embodiment, as an example, identification of a movable axis is avoided, and rotation about an axis configured by using a fixed vector n is considered for all joints. For a geometric model of axial symmetry such as a cylinder and a circular cone, a degree of freedom around an axis is indeterminate, and may be eliminated. Specifically, a geometric model of axial symmetry has two degrees of freedom except a degree of freedom around an axis. Therefore, for a geometric model of axial symmetry, only $\Delta\theta_{LX}$ and $\Delta\theta_{LXX}$ among $\Delta\theta_{JO}A$, $\Delta\theta_{LX}$, and $\Delta\theta_{LXX}$ may be calculated by excluding a joint rotation around an axis $\Delta\theta_{JO}$ from $\Delta\theta_{JO}$, $\Delta\theta_{LX}$, and $\Delta\theta_{LXX}$. This can decrease a computation load efficiently. When a rotation angle of an actual movable axis is desired, the rotation angle can be obtained by a conversion of the rotation matrix above.

In the embodiment described above, as an example, for all geometric models of the object model, four model parameters of the position $c_m$, the direction $e_m$, the thickness $r_m$, and the length $l_m$ are optimized by fitting; however, an embodiment is not limited to this. For example, for some generic models of the object model, only three or less model parameters among four model parameters of the position $c_m$, the direction $e_m$, the thickness $r_m$, and the length $l_m$ may be optimized by fitting. For example, for the thickness $r_m$ and the length $l_m$, an optimal solution obtained in the first scene may be used as it is in subsequent scenes. This is because the thickness and length of parts of the object person S are basically constant.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. An information processing apparatus, comprising:
   a memory; and
   a processor coupled to the memory and configured to
   obtain point cloud data related to a surface of an object including a plurality of parts connected through joints from a sensor that obtains three-dimensional position information;
   perform, based on an object model that represents the plurality of parts by using a plurality of geometric models each having an axis, and the point cloud data, a search for an optimal solution of the object model that fits the point cloud data by changing the object model; and
   output the optimal solution or information of the object based on the optimal solution,
   wherein the changing the object model includes changing shapes of the plurality of geometric models among at least two of a cylinder, a cone, a truncated cone, an elliptic cylinder, an elliptic cone, and a truncated elliptic cone, and the search for the optimal solution includes searching for an optimal combination of the shapes of the plurality of geometric models.

2. The information processing apparatus as claimed in claim 1, wherein the search for the optimal solution includes deriving an index value, which is probabilistic, of a fitting level of the geometric model with respect to the point cloud data, and determining a type of the geometric model of which the index value indicates a best fitting level as the optimal type, for each of the plurality of parts.

3. The information processing apparatus as claimed in claim 2, wherein the index value is related to a residual of the point cloud data with respect to the surface of the geometric model.

4. The information processing apparatus as claimed in claim 3, wherein the search for the optimal solution of the object model that fits the point cloud data is based on an EM algorithm, and the index value is a data sum of a posterior distribution.

5. The information processing apparatus as claimed in claim 1, wherein the changing the object model includes deforming the object model, and the search for the optimal solution includes searching for at least one of an axis direction, optimal length in a direction perpendicular to the axis direction, and optimal length in the axis direction, for each of the plurality of geometric models.

6. The information processing apparatus as claimed in claim 1, wherein the changing the object model includes deforming the object model based on forward kinematics using a mechanistic model.

7. An information processing apparatus comprising:
a memory; and
a processor coupled to the memory and configured to
obtain point cloud data related to a surface of an object including a plurality of parts connected through joints from a sensor that obtains three-dimensional position information;
perform, based on an object model that represents the plurality of parts by using a plurality of geometric models each having an axis, and the point cloud data, a search for an optimal solution of the object model that fits the point cloud data by changing the object model; and
output the optimal solution or information of the object based on the optimal solution,
wherein the changing the object model is accompanied with joint rotation between the plurality of parts, translation of a predetermined joint among the plurality of parts, and centroid rotation, and the search for the optimal solution includes searching for an optimal position and an optimal direction for each of the plurality of geometric models.

8. The information processing apparatus as claimed in claim 7, wherein the changing the object model further includes changing length in an axis direction of at least one of the plurality of geometric models, and the search for the optimal solution includes updating a direction of each of the plurality of geometric models in accordance with deformation corresponding to the joint rotation, the translation of the predetermined joint, and the centroid rotation in changing the object model, and updating positions of the plurality of geometric models based on an updated direction and changed length.

9. The information processing apparatus as claimed in claim 7, wherein the predetermined joint is a joint on a root side of a joint that is not moved by the joint rotation of other parts among the plurality of parts.

10. The information processing apparatus as claimed in claim 5, wherein the processor continues searching for the optimal solution until a convergent condition is satisfied, and the convergent condition is satisfied when change amount from previous value of the optimal solution is smaller than or equal to a predetermined change amount.

11. An information processing apparatus comprising:
a memory; and
a processor coupled to the memory and configured to
obtain point cloud data related to a surface of an object including a plurality of parts connected through joints from a sensor that obtains three-dimensional position information;
perform, based on an object model that represents the plurality of parts by using a plurality of geometric models each having an axis, and the point cloud data, a search for an optimal solution of the object model that fits the point cloud data by changing the object model; and
output the optimal solution or information of the object based on the optimal solution,
wherein the object is a human being or a humanoid robot, and the processor deforms the object model from an initial state of the object model, and the initial state of the object model includes a state in which a centroid of the object model matches a centroid of the point cloud data and in which geometric models corresponding to left and right arm parts of the object among the plurality of geometric models, are open on each side.

12. The information processing apparatus as claimed in claim 11, wherein the search for the optimal solution includes deriving an index value, which is probabilistic, of a fitting level of a geometric model of the plurality of geometric models with respect to the point cloud data for each of the plurality of geometric models, and the processor searches again for the optimal solution after reconfiguring the initial state when a sum of the index value for each of the plurality of geometric models is smaller or equal to a predetermined threshold.

13. The information processing apparatus as claimed in claim 11, wherein the processor searches for the optimal solution that minimizes a residual of the point cloud data with respect to the surfaces of the plurality of geometric models by maximizing an expected value of a likelihood function, and the likelihood function includes at least one of a regularization term and a penalty term related to symmetry of the object model.

14. A non-transitory computer-readable storage medium having stored therein a model data creating program for causing a computer to execute a process comprising:
obtaining point cloud data related to a surface of an object including a plurality of parts connected through joints from a sensor that obtains three-dimensional position information;
searching, based on an object model that represents the plurality of parts by using a plurality of geometric models each having an axis, and the point cloud data, for an optimal solution of the object model that fits the point cloud data by changing the object model; and
outputting the optimal solution or information of the object based on the optimal solution,
wherein the changing the object model includes changing shapes of the plurality of geometric models among at least two of a cylinder, a cone, a truncated cone, an elliptic cylinder, an elliptic cone, and a truncated elliptic cone, and the searching for the optimal solution includes searching for an optimal combination of the shapes of the plurality of geometric models.

15. A model data creating method executed by a computer, the method comprising:
obtaining point cloud data related to a surface of an object including a plurality of parts connected through joints from a sensor that obtains three-dimensional position information;
searching, based on an object model that represents the plurality of parts by using a plurality of geometric models each having an axis, and the point cloud data, for an optimal solution of the object model that fits the point cloud data by changing the object model; and
outputting the optimal solution or information of the object based on the optimal solution,
wherein the changing the object model includes changing shapes of the plurality of geometric models among at least two of a cylinder, a cone, a truncated cone, an elliptic cylinder, an elliptic cone, and a truncated elliptic cone, and the searching for the optimal solution includes searching for an optimal combination of the shapes of the plurality of geometric models.

* * * * *